US010113490B2

(12) United States Patent
Kosaka et al.

(10) Patent No.: US 10,113,490 B2
(45) Date of Patent: Oct. 30, 2018

(54) CONTROL APPARATUS FOR INTERNAL COMBUSTION ENGINE

(71) Applicant: HONDA MOTOR CO., LTD., Tokyo (JP)

(72) Inventors: Yosuke Kosaka, Wako (JP); Eri Ito, Wako (JP); Masaki Ueno, Wako (JP); Yuto Katori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 15/318,738

(22) PCT Filed: Jun. 23, 2015

(86) PCT No.: PCT/JP2015/068053
§ 371 (c)(1),
(2) Date: Dec. 14, 2016

(87) PCT Pub. No.: WO2016/006438
PCT Pub. Date: Jan. 14, 2016

(65) Prior Publication Data
US 2017/0114728 A1    Apr. 27, 2017

(30) Foreign Application Priority Data

Jul. 11, 2014 (JP) ................................. 2014-143493

(51) Int. Cl.
*F02D 13/02* (2006.01)
*F01L 1/344* (2006.01)
(Continued)

(52) U.S. Cl.
CPC .......... *F02D 13/0215* (2013.01); *F01L 1/344* (2013.01); *F01L 1/3442* (2013.01);
(Continued)

(58) Field of Classification Search
CPC ............. F02D 13/0215; F02D 13/0219; F02D 13/0261; F02D 41/0002; F02D 41/0062;
(Continued)

(56) References Cited

U.S. PATENT DOCUMENTS 6,024,062 A * 2/2000 Kako ........................ F01L 1/34
123/90.17
6,196,173 B1 * 3/2001 Takahashi ........... F02D 13/0219
123/90.15
(Continued)

FOREIGN PATENT DOCUMENTS

JP     2002-227687 A     8/2002
JP     2003-83131 A      3/2003
(Continued)

OTHER PUBLICATIONS

International Search Report dated Aug. 18, 2015, issued in counterpart application No. PCT/JP2015/068053. (2 pages).

*Primary Examiner* — Thomas Moulis
*Assistant Examiner* — John Bailey
(74) *Attorney, Agent, or Firm* — Westerman, Hattori, Daniels & Adrian, LLP

(57) ABSTRACT

A control apparatus for an internal combustion engine, which, in the case of intake-side and exhaust-side cleaning controls being performed, is capable of ensuring stable combustion of a mixture when the engine is returned from a decelerating FC operation to a normal operation, thereby making it possible to enhance marketability. The control apparatus for the engine includes an ECU. The ECU performs intake-side cleaning control for controlling an intake cam phase CAIN to a predetermined most advanced value CAIN_ADV so as to increase a valve overlap period of an intake valve and an exhaust valve, and performs exhaust-side cleaning control for controlling an exhaust cam phase CAEX to a predetermined most retarded value CAEX_RET (Continued)

so as to increase the valve overlap period of the intake valve and the exhaust valve. Further, during execution of one of the intake-side and exhaust-side cleaning controls, the ECU inhibits execution of the other.

7 Claims, 13 Drawing Sheets

(51) Int. Cl.
*F02D 41/00* (2006.01)
*F02D 41/12* (2006.01)
*F02D 41/22* (2006.01)
*F02D 35/02* (2006.01)

(52) U.S. Cl.
CPC ..... *F02D 13/0219* (2013.01); *F02D 13/0261* (2013.01); *F02D 41/0002* (2013.01); *F02D 41/0062* (2013.01); *F02D 41/123* (2013.01); *F02D 41/22* (2013.01); *F01L 2800/00* (2013.01); *F01L 2800/10* (2013.01); *F02D 35/023* (2013.01); *F02D 2041/001* (2013.01); *Y02T 10/18* (2013.01); *Y02T 10/42* (2013.01); *Y02T 10/47* (2013.01)

(58) Field of Classification Search
CPC ...... F02D 41/123; F02D 41/22; F02D 35/023; F02D 2041/001; F02D 13/02; F02D 13/0238; F02D 2200/0812; F01L 1/344; F01L 1/3442; F01L 2800/00; F01L 2800/10; F01L 1/34; F01L 2001/34436; Y02T 10/18; Y02T 10/42; Y02T 10/47

USPC .......... 123/321, 90.15, 90.17, 324–325, 344, 123/347–348, 332–333, 402, 405, 493; 701/108, 34.4

See application file for complete search history.

(56) References Cited

U.S. PATENT DOCUMENTS

| | | | |
|---|---|---|---|
| 7,171,943 B1* | 2/2007 | Wada | F01L 1/34 123/348 |
| 9,726,053 B2* | 8/2017 | Nunami | F01L 1/3442 |
| 2003/0054921 A1* | 3/2003 | Furukawa | F01L 1/022 477/111 |
| 2003/0136376 A1* | 7/2003 | Tachibana | F01L 1/344 123/396 |
| 2008/0041339 A1* | 2/2008 | Nishikiori | F02D 13/0261 123/406.48 |
| 2009/0078222 A1* | 3/2009 | Murao | F01L 1/3442 123/90.17 |
| 2010/0122861 A1* | 5/2010 | Padilla | F01L 1/34 180/65.28 |
| 2014/0150741 A1* | 6/2014 | Hayashi | F01L 1/3442 123/90.15 |
| 2016/0169061 A1* | 6/2016 | Iwaya | F01L 1/3442 123/90.15 |

FOREIGN PATENT DOCUMENTS

| | | |
|---|---|---|
| JP | 2003-214205 A | 7/2003 |
| JP | 3668167 B2 | 7/2005 |
| JP | 2007-100522 A | 4/2007 |
| JP | 2009-74402 A | 4/2009 |
| JP | 2012-31741 A | 2/2012 |

* cited by examiner

CONTROL APPARATUS FOR INTERNAL COMBUSTION ENGINE

TECHNICAL FIELD

The present invention relates to a control apparatus for an internal combustion engine that includes a variable intake cam phase mechanism and a variable exhaust cam phase mechanism each of a hydraulically-driven type, the control apparatus controlling an intake cam phase and an exhaust cam phase via the variable intake cam phase mechanism and the variable exhaust cam phase mechanism.

BACKGROUND ART

Conventionally, the present applicant has already proposed a control apparatus for an internal combustion engine, as disclosed in in PTL 1. The engine is provided with a variable intake cam phase mechanism of a hydraulically-driven type. The variable intake cam phase mechanism changes an intake cam phase, which is a phase of an intake cam for opening and closing an intake valve, with respect to a crankshaft, between a predetermined most advanced value and a predetermined most retarded value. In this case, when the intake cam phase is controlled to the predetermined most advanced value, a valve overlap period becomes maximum.

In the case of the above variable intake cam phase mechanism, since it is the hydraulically-driven type, there is a fear that when foreign matter, such as sludge, is mixed in a hydraulic pressure circuit, a malfunction of a hydraulic pressure control valve or the like occurs. In the control apparatus, as described hereinafter, cleaning control of the variable intake cam phase mechanism (hereinafter referred to as the "intake-side cleaning control") is performed during a decelerating fuel-cut operation (hereinafter referred to as the "decelerating FC operation"). First, the intake cam phase is controlled to a most retarded value at a time when the decelerating FC operation is started, and the intake cam phase is controlled to a most advanced value at a time when a predetermined time period has elapsed after the start time of the decelerating FC operation.

Then, at a time when an execution time period over which the control of the intake cam phase to the most advanced value has been performed reaches a predetermined value, it is determined whether or not the intake cam phase has reached the most advanced value, and the variable intake cam phase mechanism is controlled such that the intake cam phase is changed from the most advanced value to the most retarded value. By the above cleaning control, it is possible to prevent foreign matter, such as sludge, from causing a malfunction of the hydraulic pressure control valve or the like.

Further, it is described in PTL 1 that in a case where a variable exhaust cam phase mechanism capable of changing an exhaust cam phase is provided in the engine, cleaning control of the variable exhaust cam phase mechanism (hereinafter referred to as the "exhaust-side cleaning control") may be performed.

CITATION LIST

Patent Literature

[PTL 1] Publication of Japanese Patent No. 3668167

SUMMARY OF INVENTION

Technical Problem

In a case where in the engine provided with both the variable intake cam phase mechanism and the variable exhaust cam phase mechanism, the above-described control method disclosed in PTL 1 is applied to thereby perform both the intake-side cleaning control and the exhaust-side cleaning control, there can arise the following problems:

Since the intake-side and exhaust-side cleaning controls are performed during the decelerating FC operation, even in the course of the intake-side and exhaust-side cleaning controls, they have to be forcibly terminated simultaneously with termination of the decelerating FC operation. In a case where the intake-side and exhaust-side cleaning controls are forcibly terminated, the valve overlap period is sometimes increased to make an internal EGR amount larger, depending on the values of the exhaust cam phase and the intake cam phase. If the engine is returned in this state from the decelerating FC operation to a normal operation, this causes degradation of combustion of a mixture, and there is a possibility of causing engine stall in the worst case. The above problem becomes the most conspicuous when the valve overlap period is made longest by controlling the intake cam phase to the most advanced value and the exhaust cam phase to the most retarded value, respectively, at the termination time of the intake-side and exhaust-side cleaning controls.

The present invention has been made to provide a solution to the above-described problems, and an object thereof is to provide a control apparatus for an internal combustion engine, which, in the case of performing intake-side and exhaust-side cleaning controls, is capable of ensuring stable combustion of a mixture when the engine is returned from a decelerating FC operation to a normal operation, thereby making it possible to enhance marketability.

Solution to Problem

To attain the above object, the invention according to claim 1 is a control apparatus 1 for an internal combustion engine 3 that includes a variable intake cam phase mechanism 12 of a hydraulically-driven type for changing an intake cam phase CAIN which is a phase of an intake cam 11a for opening and closing an intake valve 4 with respect to a crankshaft 3, and a variable exhaust cam phase mechanism 22 of a hydraulically-driven type for changing an exhaust cam phase CAEX which is a phase of an exhaust cam 21a for opening and closing an exhaust valve 5 with respect to the crankshaft 3c, the control apparatus 1 controlling the intake cam phase CAIN and the exhaust cam phase CAEX via the variable intake cam phase mechanism 12 and the variable exhaust cam phase mechanism 22, comprising intake-side cleaning control means (ECU2, step 6) for performing intake-side cleaning control that controls the intake cam phase CAIN to be advanced such that a valve overlap period of the intake valve 4 and the exhaust valve 5 is increased, exhaust-side cleaning control means (ECU2, step 11) for performing exhaust-side cleaning control that controls the exhaust cam phase CAEX to be retarded such that the valve overlap period of the intake valve 4 and the exhaust valve 5 is increased, and selection inhibition means (ECU 2, steps 26, 28, 32, 72) for selecting one of the intake-side cleaning control by the intake-side cleaning control means and the exhaust-side cleaning control by the exhaust-side cleaning control means so as to cause the one to be performed, and inhibiting the other thereof, according to an operating state of the engine 3.

According to this control apparatus for an internal combustion engine, the intake-side cleaning control means performs the intake-side cleaning control for controlling the intake cam phase to be advanced such that the valve overlap period of the intake valve and the exhaust valve is increased, and the exhaust-side cleaning control means performs the exhaust-side cleaning control for controlling the exhaust cam phase to be retarded such that the valve overlap period of the intake valve and the exhaust valve is increased. In this case, the selection inhibition means selects one of the intake-side cleaning control by the intake-side cleaning control means and the exhaust-side cleaning control by the exhaust-side cleaning control means so as to cause the one to be performed, and inhibits the other, according to the operating state of the engine. That is, only one of the intake-side cleaning control and the exhaust-side cleaning control is performed as cleaning control, so that differently from the case of PTL 1, at a time when the decelerating FC operation is terminated and the cleaning control is forcibly terminated, it is possible to prevent both of the exhaust cam phase and the intake cam phase from being held at values that increase the valve overlap period, which makes it possible to avoid a state in which the internal EGR amount is large. Particularly, it is possible to avoid a state in which the valve overlap period is longest, thereby making it possible to avoid a state in which the internal EGR amount is largest. As a consequence, when the engine is returned from the decelerating FC operation to the normal operation, it is possible to ensure stable combustion of a mixture, thereby making it possible to enhance marketability.

The invention according to claim 2 is the control apparatus 1 for the internal combustion engine 3, according to claim 1, wherein in the intake-side cleaning control, the intake cam phase CAIN is controlled such that the intake cam phase becomes equal to a predetermined most advanced value CAIN_ADV, the control apparatus further comprising intake cam phase-detecting means (ECU 2, crank angle sensor 30, intake cam angle sensor 37) for detecting the intake cam phase CAIN, and intake-side execution completion-determining means (ECU 2, steps 55 and 56) for determining that the intake-side cleaning control has been executed, when the intake cam phase CAIN detected during execution of the intake-side cleaning control has reached the predetermined most advanced value CAIN_ADV.

According to this control apparatus, in the intake-side cleaning control, the intake cam phase is controlled such that it becomes equal to the predetermined most advanced value, and when the intake cam phase detected during execution of the intake-side cleaning control has reached the predetermined most advanced value, it is determined that the intake-side cleaning control has been executed, and hence it is possible to accurately determine that the intake-side cleaning control has been executed. This makes it possible to prevent the intake-side cleaning control from being executed more than necessary, thereby making it possible to further enhance marketability.

The invention according to claim 3 is the control apparatus 1 for the internal combustion engine 3, according to claim 1 or 2, wherein in the exhaust-side cleaning control, the exhaust cam phase CAEX is controlled such that the exhaust cam phase becomes equal to a predetermined most retarded value CAEX_RET, the control apparatus further comprising exhaust cam phase-detecting means (ECU2, crank angle sensor 30, exhaust cam angle sensor 38) for detecting the exhaust cam phase CAEX, and exhaust-side execution completion-determining means (ECU 2, steps 95 and 96) for determining that the exhaust-side cleaning control has been executed, when the exhaust cam phase CAEX detected during execution of the exhaust-side cleaning control has reached the predetermined most retarded value CAEX_RET.

According to this control apparatus, in the exhaust-side cleaning control, the exhaust cam phase is controlled such that it becomes equal to the predetermined most retarded value, and when the exhaust cam phase detected during execution of the exhaust-side cleaning control has reached the predetermined most retarded value, it is determined that the exhaust-side cleaning control has been executed, and hence it is possible to accurately determine that the exhaust-side cleaning control has been executed. This makes it possible to prevent the exhaust-side cleaning control from being executed more than necessary, thereby making it possible to further enhance marketability.

The invention according to claim 4 is the control apparatus 1 for the internal combustion engine 3, according to any one of claims 1 to 3, wherein the intake-side cleaning control and the exhaust-side cleaning control are performed during a decelerating fuel-cut operation of the engine 3, the control apparatus further comprising estimated internal EGR amount-calculating means (ECU 2, step 111) for calculating an estimated internal EGR amount GEGRD, which is an estimated value of an internal EGR amount in a cylinder 3a of the engine 3, during the decelerating fuel-cut operation, and operating state control means (ECU 2, step 117) for controlling an operating state of the engine 3, using the calculated estimated internal EGR amount GEGRD, after termination of the decelerating fuel-cut operation.

In general, the throttle valve is controlled to a fully-closed state during the decelerating fuel-cut operation, and therefore, an air amount detected by an air flow sensor and the like becomes equal to 0, so that when the engine is returned from the decelerating FC operation to the normal operation, an in-cylinder air amount as a calculated value is calculated as a very small value, although air exists in the cylinder even during the decelerating FC operation. As a consequence, since an air-fuel ratio of a mixture is controlled to a leaner side more than necessary in air-fuel ratio control, there is a fear that a combustion of the mixture becomes unstable, or exhaust emission characteristics are degraded. On the other hand, according to the above control apparatus, the intake-side cleaning control and the exhaust-side cleaning control are performed during the decelerating fuel-cut operation of the engine. Further, during the decelerating fuel-cut operation, the estimated internal EGR amount, which is the estimated value of the internal EGR amount in the cylinder of the engine, is calculated, and after termination of the decelerating fuel-cut operation, the operating state of the engine is controlled using the calculated estimated internal EGR amount, so that when the engine is returned from the decelerating FC operation to the normal operation, the in-cylinder air amount can be calculated with accuracy, whereby it is possible to control the air-fuel ratio of the mixture to an appropriate value in the air-fuel ratio control. As a result, it is possible to ensure stable combustion of the mixture, thereby making it possible to ensure excellent exhaust emission characteristics.

DESCRIPTION OF EMBODIMENTS

Figure 1:
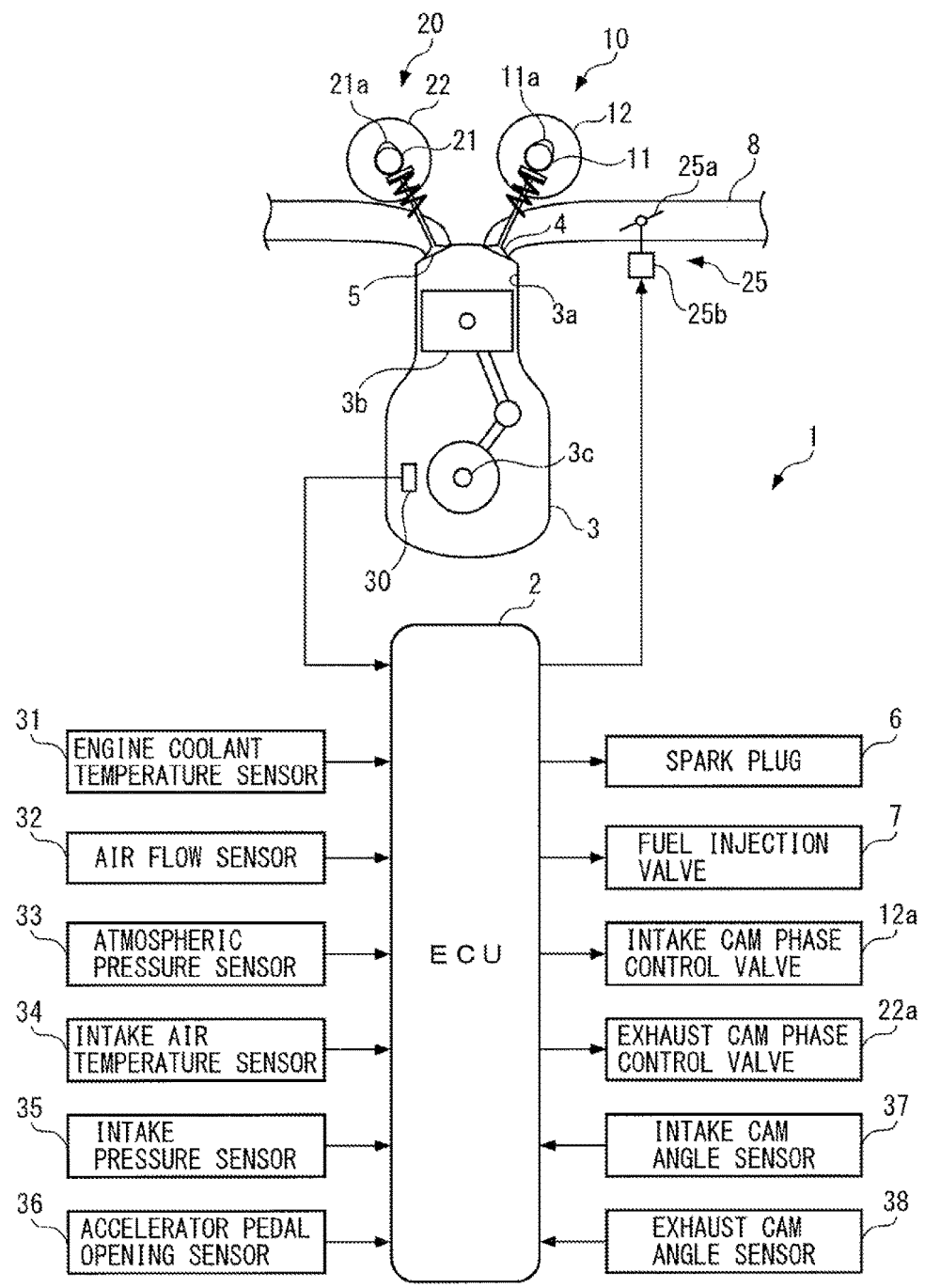
FIG. 1 A schematic diagram of a control apparatus according to an embodiment of the present invention and an internal combustion engine to which the control apparatus is applied.

A control system for an internal combustion engine, according an embodiment of the invention, will now be described in detail with reference to the drawings showing a preferred embodiment thereof. As shown in FIG. 1, the control apparatus 1 includes an ECU 2, which performs various control processes, such as a cam phase control process, according to an operating state of an internal combustion engine (hereinafter simply referred to as "the engine") 3, as described hereinafter.

The engine 3 is an in-line four-cylinder gasoline engine having four pairs of cylinders 3a and pistons 3b (only one pair of which is shown), and is installed on a vehicle, not shown. Further, the engine 3 includes intake valves 4 (only one of which is shown) provided for each cylinder 3a, exhaust valves 5 (only one of which is shown) provided for each cylinder 3a, and an intake valve-actuating mechanism 10 for actuating the intake valves 4 to open and close the same, and an exhaust valve-actuating mechanism 20 for actuating the exhaust valves 5 to open and close the same.

The intake valve-actuating mechanism 10 is comprised of an intake cam shaft 11 for actuating each intake valve 4 by an associated intake cam 11a, and a variable intake cam phase mechanism 12. The variable intake cam phase mechanism 12 changes the valve timing of each intake valve 4 by steplessly (i.e. continuously) changing a relative phase of the associated intake cam 11a, i.e. the intake cam shaft 11, with respect to a crankshaft 3c (hereinafter referred to as "the intake cam phase") CAIN toward an advanced side or a retarded side. The variable intake cam phase mechanism 12 is provided on an end of the intake cam shaft 11 toward an intake sprocket (not shown).

The variable intake cam phase mechanism 12 is a hydraulically-driven type, specifically with an arrangement similar to that proposed e.g. in Japanese Laid-Open Patent Publication (Kokai) No. 2007-100522 by the present applicant, and hence detailed description thereof is omitted, but it includes an intake cam phase control valve 12a, a hydraulic circuit, and so forth.

Figure 2:
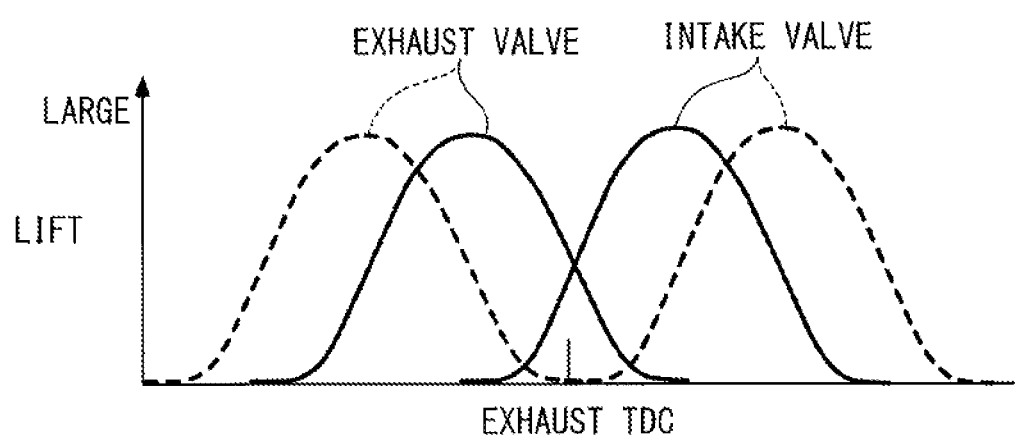
FIG. 2 A diagram showing valve lift curves of an intake valve when an intake cam phase is set to a most advanced value (solid line) and an origin value (broken line) by a variable intake cam phase mechanism, and valve lift curves of an exhaust valve when an exhaust cam phase is set to a most retarded value (solid line) and an origin value (broken line) by a variable exhaust cam phase mechanism.

In the variable intake cam phase mechanism 12, the intake cam phase control valve 12a is controlled by the ECU 2, whereby hydraulic pressure supplied from the hydraulic circuit to an advance chamber and a retard chamber of the variable intake cam phase mechanism 12 is controlled. Consequently, the intake cam phase CAIN is changed between a predetermined origin value CAIN_0 and a predetermined most advanced value CAIN_ADV, whereby the valve timing of each intake valve 4 is steplessly changed between the origin timing indicated by a broken line in FIG. 2 and the most advanced timing indicated by a solid line in FIG. 2.

In this case, the origin value CAIN_0 is set to 0, and the most advanced value CAIN_ADV is set to a predetermined positive value. Therefore, as the intake cam phase CAIN is increased from the origin value CAIN_0, the valve timing of the intake valve 4 is changed from the origin timing toward the advanced side, whereby the valve overlap period of the intake valve 4 and an associated one of the exhaust valves 5 is made longer.

Further, the exhaust valve-actuating mechanism 20 is comprised of an exhaust cam shaft 21 for actuating each exhaust valve 5 by an associated exhaust cam 21a, and a variable exhaust cam phase mechanism 22. The variable exhaust cam phase mechanism 22 changes the valve timing of each exhaust valve 5 by steplessly (i.e. continuously) changing a relative phase of the associated exhaust cam 21a, i.e. the exhaust cam shaft 21, with respect to the crankshaft 3c (hereinafter referred to as "the exhaust cam phase") CAEX toward an advanced side or a retarded side. The variable exhaust cam phase mechanism 22 is provided at an end of the exhaust cam shaft 21 toward an exhaust sprocket (not shown).

The variable exhaust cam phase mechanism 22 is a hydraulically-driven type, with an arrangement similar to that of the above-described variable intake cam phase mechanism 12, and includes an exhaust cam phase control valve 22a, a hydraulic circuit, and so forth.

In the variable exhaust cam phase mechanism 22, the exhaust cam phase control valve 22a is controlled by the ECU 2, whereby hydraulic pressure supplied from the hydraulic circuit to an advance chamber and a retard chamber of the variable exhaust cam phase mechanism 22 is controlled. Consequently, the exhaust cam phase CAEX is changed between a predetermined origin value CAEX_0 and a predetermined most retarded value CAEX_RET, whereby the valve timing of each exhaust valve 5 is steplessly changed between the origin timing indicated by a broken line in FIG. 2 and the most retarded timing indicated by a solid line in FIG. 2.

In this case, the origin value CAEX_0 is set to 0, and the most retarded value CAEX_RET is set to a predetermined positive value. Therefore, as the exhaust cam phase CAEX is increased from the origin value CAEX_0, the valve timing of the exhaust valve 5 is changed from the origin timing toward the retarded side, whereby the valve overlap period is made longer.

The engine 3 includes spark plugs 6, fuel injection valves 7, and a crank angle sensor 30, and each spark plug 6 and each fuel injection valve 7 are provided for each cylinder 3a (only one of each is shown).

The spark plug 6 is mounted through the cylinder head of the engine 3 and is electrically connected to the ECU 2, and the discharge timing of the spark plug 6 is controlled by the ECU 2. That is, the ignition timing of a mixture is controlled. Further, each fuel injection valve 7 is mounted through the cylinder head such that fuel is directly injected into each cylinder 3a. The fuel injection valve 7 is electrically connected to the ECU 2, and the amount of fuel injection by the fuel injection valve 7 and fuel injection timing are controlled by the ECU 2, as described hereinafter.

On the other hand, the crank angel sensor 30 outputs a CRK signal and a TDC signal, which are both pulse signals, to the ECU 2 along with rotation of the crankshaft 3c. One pulse of the CRK signal is output whenever the crankshaft 3c rotates through a predetermined angle (e.g. 1°), and the ECU 2 calculates a rotational speed of the engine 3 (hereinafter referred to as "the engine speed") NE based on the CRK signal. Further, the TDC signal indicates that a piston 3b in one of the cylinders 3a is in a predetermined crank angle position slightly before the TDC position of the intake stroke, and each pulse thereof is delivered whenever the crankshaft rotates through a predetermined crank angle.

Further, a throttle valve mechanism 25 is provided at an intermediate portion of an intake passage 8. The throttle valve mechanism 25 includes a throttle valve 25a and a TH actuator 25b for actuating the throttle valve 25a to open and close the same. The throttle valve 25a is pivotally provided in an intermediate portion of the intake passage 8 and changes the amount of air passing therethrough by a change in the degree of opening caused by the pivotal motion thereof.

The TH actuator 25b is formed by combining a motor (not shown) connected to the ECU 2 and a gear mechanism (not shown), and is controlled by the ECU 2 to thereby change the degree of opening of the throttle valve 25a. In the case of the present embodiment, during a decelerating fuel-cut operation, described hereinafter, the TH actuator 25b is controlled by the ECU 2, whereby the throttle valve 25a is held in a fully-closed state.

Furthermore, an engine coolant temperature sensor 31, an air flow sensor 32, an atmospheric pressure sensor 33, an intake air temperature sensor 34, an intake pressure sensor 35, an accelerator pedal opening sensor 36, an intake cam angle sensor 37, and an exhaust cam angle sensor 38 are electrically connected to the ECU 2. The engine coolant temperature sensor 31 detects an engine coolant temperature TW, which is the temperature of engine coolant circulating through a cylinder block of the engine 3, to deliver a detection signal indicative of the detected engine coolant temperature TW to the ECU 2.

Further, the air flow sensor 32 is provided in the intake passage 8 at a location upstream of the throttle valve 25a, and detects an air amount GAIR (mass flow rate) of air flowing through the intake passage 8 to deliver a detection signal indicative of the detected air amount GAIR to the ECU 2. Furthermore, the atmospheric pressure sensor 33 detects an atmospheric pressure PA and delivers a detection signal indicative of the detected atmospheric pressure PA to the ECU 2.

On the other hand, the intake air temperature sensor 34 is provided in the intake passage 8 at a location downstream of the throttle valve 25a, and detects a gas temperature in the intake passage 8 (hereinafter referred to as the "intake air temperature") TB to deliver a detection signal indicative of the detected intake air temperature TB to the ECU 2. The intake air temperature TB is detected as an absolute temperature.

Further, the intake pressure sensor 35 as well is provided in the intake passage 8 at a location downstream of the throttle valve 25a, and detects a gas pressure in the intake passage 8 (hereinafter referred to as the "intake pressure") PB to deliver a detection signal indicative of the detected intake pressure PB to the ECU 2. The intake pressure PB is detected as an absolute temperature. Further, the accelerator pedal opening sensor 36 detects a stepped-on amount of an accelerator pedal (not shown) of the vehicle (hereinafter referred to as "the accelerator pedal opening") AP, and delivers a detection signal indicative of the detected accelerator pedal opening AP to the ECU 2.

Furthermore, the intake cam angle sensor 37 is provided at an end of the intake cam shaft 11 on a side thereof opposite to the variable intake cam phase mechanism 12, and outputs an intake CAM signal, which is a pulse signal, to the ECU 2 along with rotation of the intake cam shaft 11 whenever the intake cam shaft 11 rotates through a predetermined cam angle (e.g. 1°). The ECU 2 calculates the intake cam phase CAIN based on the intake CAM signal and the above-mentioned CRK signal.

Further, the exhaust cam angle sensor 38 is provided at an end of the exhaust cam shaft 21 on a side thereof opposite to the variable exhaust cam phase mechanism 22, and outputs an exhaust CAM signal, which is a pulse signal, to the ECU 2 along with rotation of the exhaust cam shaft 21 whenever the exhaust cam shaft 21 rotates through a predetermined cam angle (e.g. 1°). The ECU 2 calculates the exhaust cam phase CAEX based on the exhaust CAM signal and the above-mentioned CRK signal. In the present embodiment, the crank angle sensor 30 corresponds to intake cam phase-detecting means and exhaust cam phase-detecting means, the intake cam angle sensor 37 corresponds to the intake cam phase-detecting means, and the exhaust cam angle sensor 33 corresponds to the exhaust cam phase-detecting means.

The ECU 2 is implemented by a microcomputer comprised of a CPU, a RAM, a ROM, and an I/O interface (none of which are specifically shown), and performs a cam phase control process, a fuel injection control process, and so forth, as described hereinafter, according to the detection signals from the aforementioned sensors 30 to 38, and so forth.

Note that, the present embodiment, the ECU 2 corresponds to intake-side cleaning control means, exhaust-side cleaning control means, selection inhibition means, the intake cam phase-detecting means, intake-side execution completion-determining means, the exhaust cam phase-detecting means, exhaust-side execution completion-determining means, estimated internal EGR amount-calculating means, and operating state control means.

Next, a description will be given of the cam phase control process with reference to FIG. 3. The cam phase control process is for controlling the intake cam phase CAIN and the exhaust cam phase CAEX by driving the variable intake cam phase mechanism 12 and the variable exhaust cam phase mechanism 22, and is performed by the ECU 2 at a predetermined control period ΔT (e.g. 10 msec).

Note that it is assumed that values of various flags which are set in control processes, described hereinafter, are stored in the RAM when an ignition switch is in an ON state, and are reset to 0 when the ignition switch is turned off. Similarly to this, it is assumed that various calculated values and setting values as well are stored in the RAM when the ignition switch is in the ON state, and are reset to 0 when the ignition switch is turned off.

Figure 3:
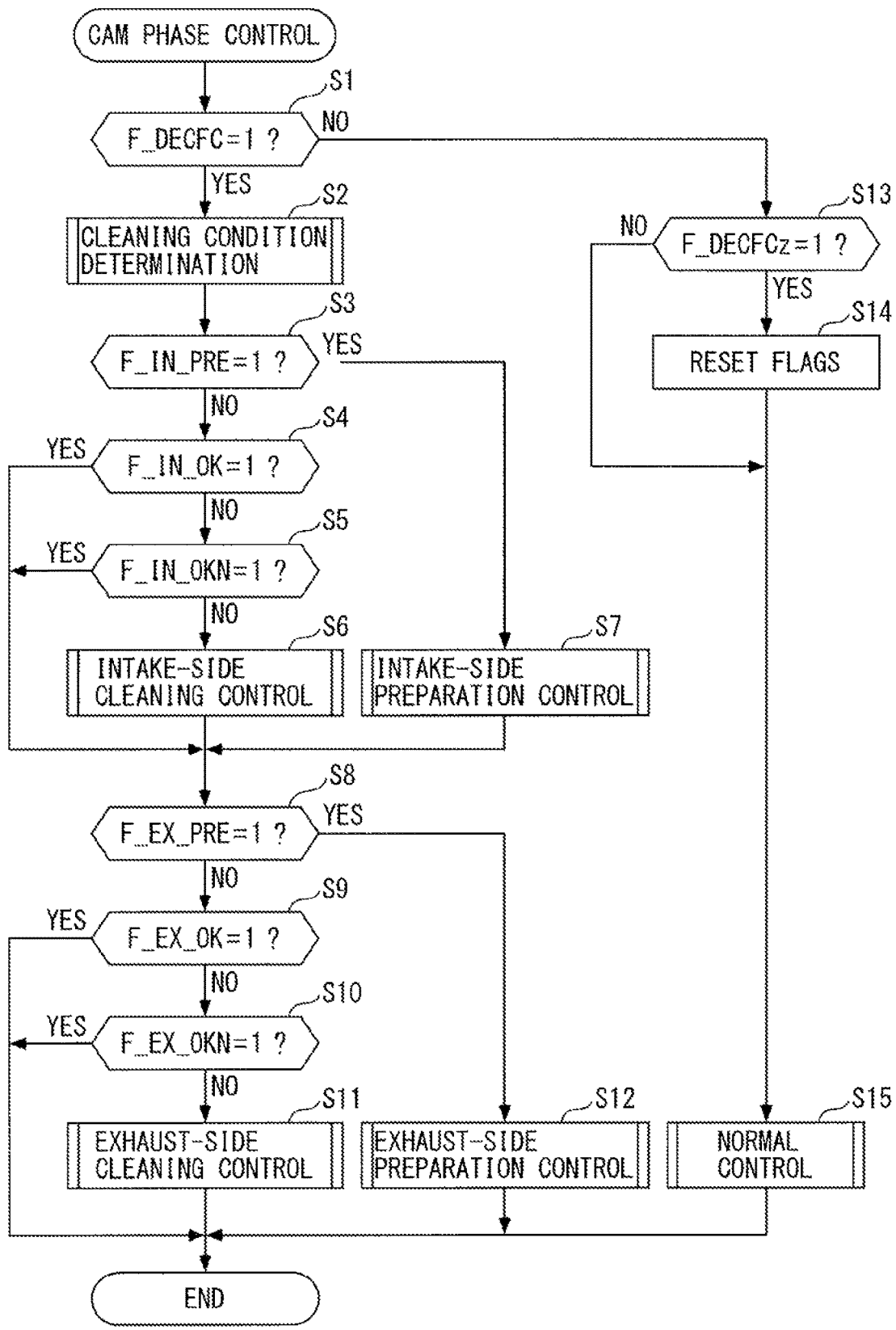
FIG. 3 A flowchart of a cam phase control process.

As shown in FIG. 3, first, in a step 1 (shown as S1; similarly shown hereafter), it is determined whether or not a decelerating fuel-cut operation flag F_DECFC is equal to 1. The decelerating fuel-cut operation flag F_DECFC is set, in a determination process (not shown), to 1 when both of the following conditions (f1) and (f2) for executing a decelerating FC operation are satisfied and to 0 when not satisfied.

(f1) The accelerator pedal opening AP is equal to a value indicative of a fully-closed state of the accelerator pedal (e.g. 0).

(f2) The engine speed NE is not lower than a predetermined rotational speed (e.g. 900 rpm).

Figure 4:
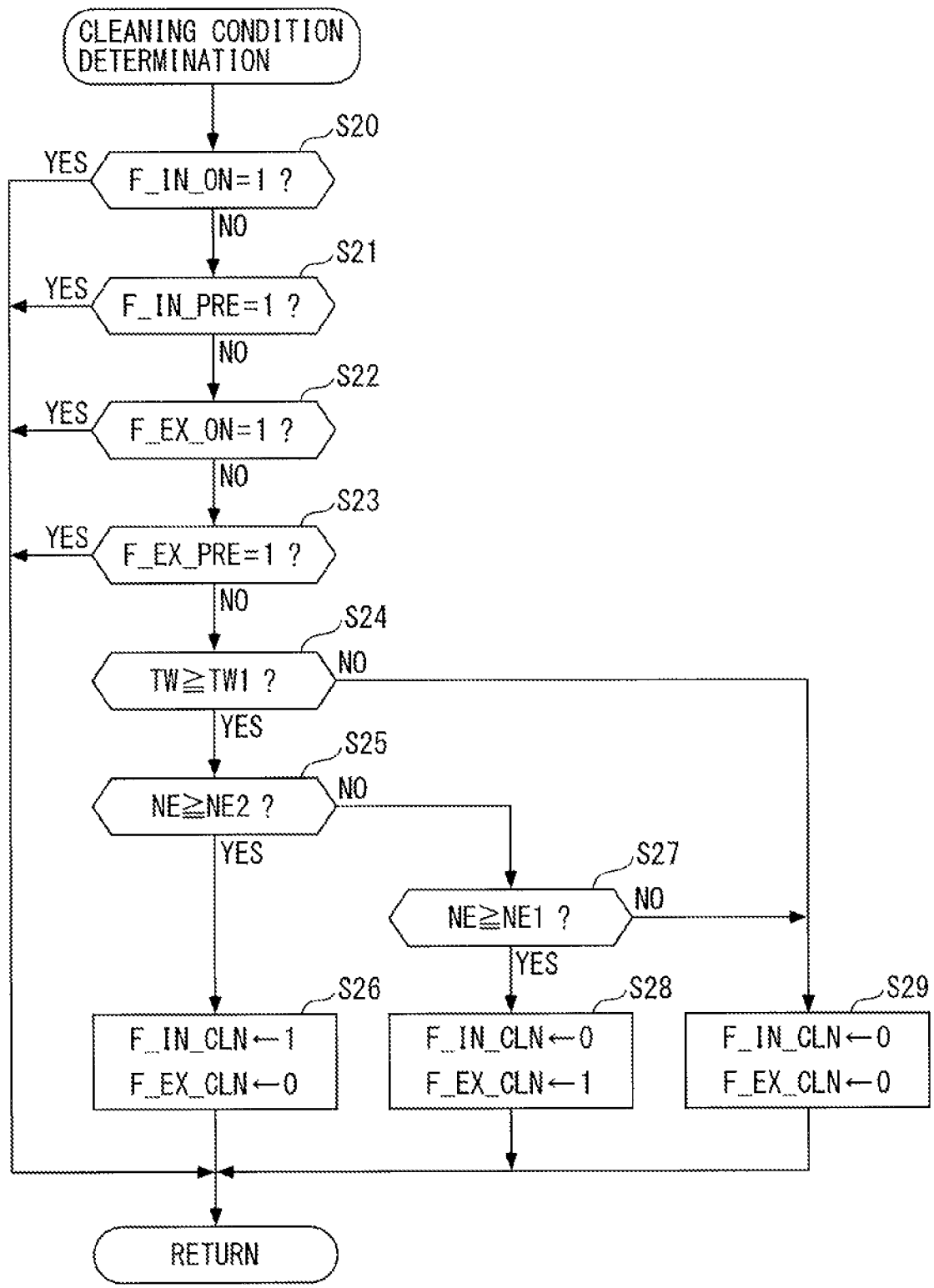
FIG. 4 A flowchart of a cleaning condition determination process.

If the answer to the question of the step 1 is affirmative (YES), i.e. if the conditions for executing the decelerating FC operation are satisfied, the process proceeds to a step 2, wherein a cleaning condition determination process is performed. The cleaning condition determination process determines whether or not conditions for executing an intake-side cleaning control process and an exhaust-side cleaning control process, described hereinafter, are satisfied. The cleaning condition determination process is specifically performed, as described hereafter with reference to FIG. 4.

As shown in the figure, first, in a step 20, it is determined whether or not an intake-side cleaning in-process flag F_IN_ON is equal to 1. The intake-side cleaning in-process flag F_IN_ON indicates whether or not the intake-side cleaning control process is being performed.

If the answer to the question of the step 20 is affirmative (YES), i.e. if the intake-side cleaning control process is being performed, the present process is immediately terminated.

On the other hand, if the answer to the question of the step 20 is negative (NO), the process proceeds to a step 21, wherein it is determined whether or not an intake-side preparation flag F_IN_PRE is equal to 1. The intake-side preparation flag F_IN_PRE indicates whether or not an intake-side preparation process, described hereinafter, is being performed.

If the answer to the question of the step 21 is affirmative (YES), i.e. if the intake-side preparation process is being performed, the present process is immediately terminated.

On the other hand, if the answer to the question of the step 21 is negative (NO), the process proceeds to a step 22, wherein it is determined whether or not an exhaust-side cleaning in-process flag F_EX_ON is equal to 1. The exhaust-side cleaning in-process flag F_EX_ON indicates whether or not the exhaust-side cleaning control process is being performed.

If the answer to the question of the step 22 is affirmative (YES), i.e. if the exhaust-side cleaning control process is being performed, the present process is immediately terminated.

On the other hand, if the answer to the question of the step 22 is negative (NO), the process proceeds to a step 23, wherein it is determined whether or not an exhaust-side preparation flag F_EX_PRE is equal to 1. The exhaust-side preparation flag F_EX_PRE indicates whether or not an exhaust-side preparation process, described hereinafter, is being performed.

If the answer to the question of the step 23 is affirmative (YES), i.e. if the exhaust-side preparation process is being performed, the present process is immediately terminated.

On the other hand, if the answer to the question of the step 23 is negative (NO), i.e. if the above four control processes are not being performed, the process proceeds to a step 24, wherein it is determined whether or not the engine coolant temperature TW is not lower than a predetermined engine coolant temperature TW1 (e.g. 80° C.). The predetermined engine coolant temperature TW1 is a value indicating whether or not the temperature of hydraulic oil is within a temperature range in which the variable intake cam phase mechanism 12 and the variable exhaust cam phase mechanism 22 can operate smoothly.

If the answer to the question of the step 24 is affirmative (YES), it is determined that the temperature of hydraulic oil is within the temperature range in which the variable intake cam phase mechanism 12 and the variable exhaust cam phase mechanism 22 can operate smoothly, and the process proceeds to a step 25, wherein it is determined whether or not the engine speed NE is not lower than a second predetermined rotational speed NE2 (e.g. 4000 rpm).

If the answer to this question is affirmative (YES), it is determined that the conditions for executing the intake-side cleaning control process are satisfied, and to indicate the fact, the process proceeds to a step 26, wherein an intake-side cleaning condition flag F_IN_CLN is set to 1, and an exhaust-side cleaning condition flag F_EX_CLN is set to 0, followed by terminating the present process.

On the other hand, if the answer to the question of the step 25 is negative (NO), the process proceeds to a step 27, wherein it is determined whether or not the engine speed NE is not lower than a first predetermined rotational speed N1. The first predetermined rotational speed N1 is set to a value lower than the above-mentioned second predetermined rotational speed (e.g. 2000 rpm).

If the answer to the question of the step 27 is affirmative (YES), it is determined that the conditions for executing the exhaust-side cleaning control process are satisfied, and to indicate the fact, the process proceeds to a step 28, wherein the exhaust-side cleaning condition flag F_EX_CLN is set to 1, and the intake-side cleaning condition flag F_IN_CLN is set to 0, followed by terminating the present process.

On the other hand, if the answer to the question of the step 24 or 27 is negative (NO), i.e. if TW<TW1 or NE<NE1 holds, it is determined that neither the conditions for executing the intake-side cleaning control process nor the conditions for executing the exhaust-side cleaning control process are satisfied, and to indicate the fact, the process proceeds to a step 29, wherein both of the intake-side cleaning condition flag F_IN_CLN and the exhaust-side cleaning condition flag F_EX_CLN are set to 0, followed by terminating the present process.

Referring again to FIG. 3, after the cleaning condition determination process is performed in the step 2, as described above, the process proceeds to a step 3, wherein it is determined whether or not the intake-side preparation flag F_IN_PRE is equal to 1. If the answer to this question is negative (NO), i.e. if the intake-side preparation process is not being performed, the process proceeds to a step 4, wherein it is determined whether or not an intake-side cleaning completion flag F_IN_OK is equal to 1.

The intake-side cleaning completion flag F_IN_OK is set to 1 when the intake cam phase CAIN has reached the most advanced value CAIN_ADV during execution of the intake-side cleaning control process, as described hereinafter. Note that, in the following description, the fact that the intake cam phase CAIN has reached the most advanced value CAIN_

ADV during execution of the intake-side cleaning control process is referred to as "the intake-side cleaning has been executed".

If the answer to the question of the step 4 is affirmative (YES), i.e. if the intake-side cleaning has been executed, it is determined that there is no need to execute the intake-side cleaning control process, the process proceeds to a step 8, described hereinafter.

On the other hand, if the answer to the question of the step 4 is negative (NO), the process proceeds to a step 5, wherein it is determined whether or not an intake-side operation completion flag F_IN_OKN is equal to 1. The intake-side operation completion flag F_IN_OKN is set to 1 when the intake cam phase CAIN has reached the most advanced value CAIN_ADV during execution of a normal control process, described hereinafter.

If the answer to the question of the step 5 is affirmative (YES), i.e. if the intake cam phase CAIN has reached the most advanced value CAIN_ADV during execution of the normal control process, it is determined that there is no need to execute the intake-side cleaning control process, the process proceeds to the step 8, described hereinafter.

On the other hand, if the answer to the question of the step 5 is negative (NO), i.e. if the intake-side cleaning has not been executed, and also it is estimated that the intake cam phase CAIN has not yet reached the most advanced value CAIN_ADV during execution of the normal control process, it is determined that the intake-side cleaning control process should be performed, and the process proceeds to a step 6, wherein the intake-side cleaning control process is performed.

Figure 5:
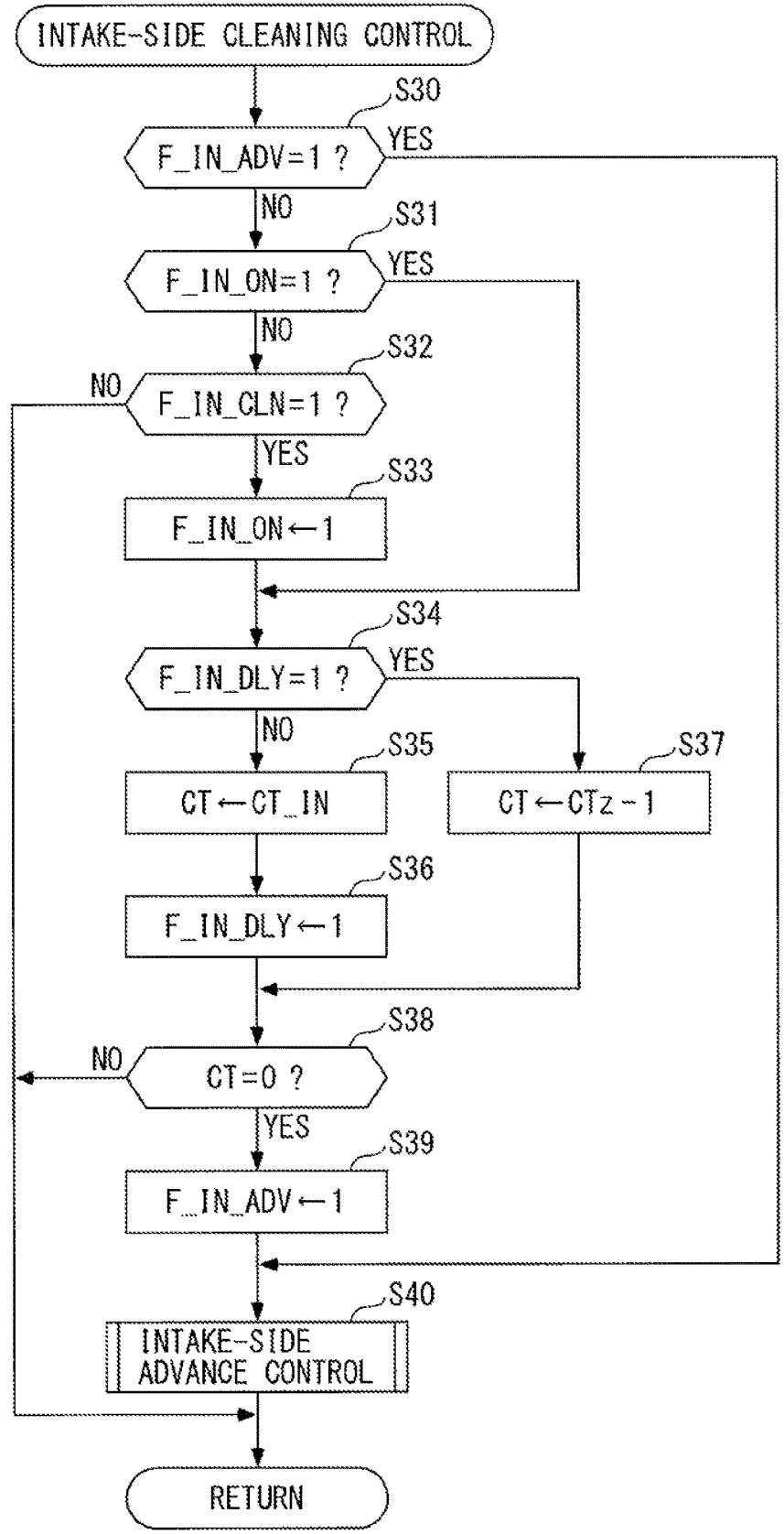
FIG. 5 A flowchart of an intake-side cleaning control process.

More specifically, the intake-side cleaning control process is specifically performed, as described hereafter with reference to FIG. 5. As shown in the figure, first, in a step 30, it is determined whether or not an intake-side advanced flag F_IN_ADV is equal to 1. The intake-side advanced flag F_IN_ADV indicates whether or not an intake-side advance control process, described hereinafter, is being performed.

If the answer to the question of the step 30 is negative (NO), i.e. if the intake-side advance control process is not being performed, the process proceeds to a step 31, wherein it is determined whether or not the intake-side cleaning in-process flag F_IN_ON is equal to 1.

If the answer to this question is negative (NO), the process proceeds to a step 32, wherein it is determined whether or not the above-mentioned intake-side cleaning condition flag F_IN_CLN is equal to 1. If the answer to this question is negative (NO), i.e. if the conditions for executing the intake-side cleaning control process are not satisfied, the present process is immediately terminated.

On the other hand, if the answer to the question of the step 32 is affirmative (YES), it is determined that the intake-side cleaning control process should be performed, and to indicate the fact, the process proceeds to a step 33, wherein the intake-side cleaning in-process flag F_IN_ON is set to 1.

After the intake-side cleaning in-process flag F_IN_ON is thus set to 1 in the step 33, the answer to the question of the step 31 becomes affirmative (YES) in each subsequent control time, and in this case, the process proceeds to a step 34.

In the step 34 following the above step 31 or 33, it is determined whether or not an intake-side delay flag F_IN_DLY is equal to 1. If the answer to this question is negative (NO), it is determined that an intake-side delay process should be performed, and the process proceeds to a step 35, wherein a count value CT of a counter is set to a predetermined intake-side delay value CT_IN.

Then, the process proceeds to a step 36, wherein to indicate that the intake-side delay process is being performed, the intake-side delay flag F_IN_DLY is set to 1.

After the intake-side delay flag F_IN_DLY is thus set to 1 in the step 36, the answer to the question of the step 34 becomes affirmative (YES) in each subsequent control time, and in this case, the process proceeds to a step 37, wherein the count value CT of the counter is set to a value (CTz−1) which is calculated by subtracting 1 from the immediately preceding value CTz thereof. That is, the count value CT of the counter is decremented by 1.

In a step 38 following the above step 36 or 37, it is determined whether or not the count value CT of the counter is equal to 0. If the answer to this question is negative (NO), i.e. if CT≠0 holds, the present process is immediately terminated.

On the other hand, if the answer to the question of the step 38 is affirmative (YES), i.e. if a time period corresponding to a value ΔT·CT_IN has elapsed after a time at which the conditions for executing the intake-side cleaning control process were satisfied, it is determined that the operating states of the variable intake cam phase mechanism 12 and the engine 3 are stable, and the intake-side advance control process should be performed, and to indicate the fact, the process proceeds to a step 39, wherein the intake-side advanced flag F_IN_ADV is set to 1.

After the intake-side advanced flag F_IN_ADV is thus set to 1 in the step 39, the answer to the question of the step 30 becomes affirmative (YES) in each subsequent control time, and in this case, the process proceeds to a step 40.

Figure 6:
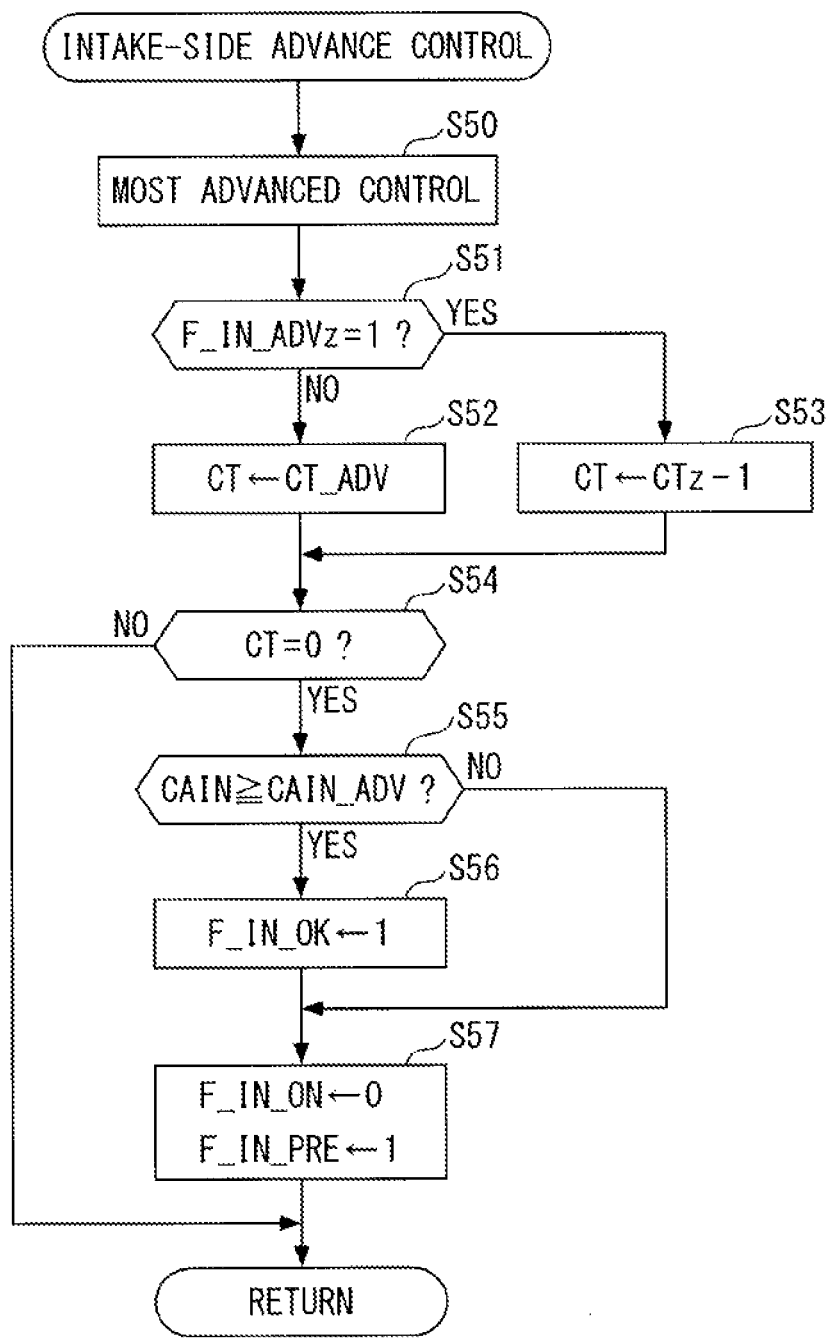
FIG. 6 A flowchart of an intake-side advance control process.

In the step 40 following the above step 31 or 39, the intake-side advance control process is performed. The intake-side advance control process is control for causing the intake cam phase CAIN to be advanced to the most advanced value CAIN_ADV, and is specifically performed, as described hereafter with reference to FIG. 6.

As shown in the figure, first, in a step 50, a most advanced control process is performed. In the most advanced control process, the variable intake cam phase mechanism 12 is controlled such that the intake cam phase CAIN becomes equal to the most advanced value CAIN_ADV.

Then, the process proceeds to a step 51, wherein it is determined whether or not the immediately preceding value F_IN_ADVz of the intake-side advanced flag is equal to 1. If the answer to this question is negative (NO), i.e. if the current control time is the first execution time of the intake-side advance control process, the count value CT of the counter is set to a predetermined advance control value CT_ADV in a step 52.

On the other hand, if the answer to the question of the step 51 is affirmative (YES), i.e. if the intake-side advance control process was being performed at the immediately preceding or earlier control time, the count value CT of the counter is set to a value (CTz−1) which is calculated by subtracting 1 from the immediately preceding value CTz thereof, in a step 53.

In a step 54 following the above step 52 or 53, it is determined whether or not the count value CT of the counter is equal to 0. If the answer to this question is negative (NO), i.e. if CT≠0 holds, the present process is immediately terminated.

On the other hand, if the answer to the question of the step 54 is affirmative (YES), i.e. if a time period corresponding to a value ΔT·CT_ADV has elapsed after the start time of execution of the most advanced control process, the process proceeds to a step 55, wherein it is determined whether or not the intake cam phase CAIN is not smaller than the most advanced value CAIN_ADV.

If the answer to this question is affirmative (YES), it is determined that the intake cam phase CAIN has reached the most advanced value CAIN_ADV, and the intake-side cleaning has been completed, and to indicate that the intake-side cleaning has been executed, the process proceeds to a step 56, wherein the intake-side cleaning completion flag F_IN_OK is set to 1.

Next, in a step 57, to indicate that the intake-side cleaning control process has been terminated, the intake-side cleaning in-process flag F_IN_ON is reset to 0, and at the same time to indicate that an intake-side preparation control process should be performed, the intake-side preparation flag F_IN_PRE is set to 1, followed by terminating the present process.

On the other hand, if the answer to the question of the step 55 is negative (NO), it is determined that although the intake-side cleaning has not been completed, the intake-side cleaning control process should be terminated to execute the intake-side preparation control process, and the step 57 is executed, as described above, followed by terminating the present process.

Referring again to FIG. 5, in the step 40, the intake-side advance control process is performed, as described above, and then the intake-side cleaning control process is terminated.

Referring again to FIG. 3, in the step 6, the intake-side cleaning control process is performed as described above. At this time, if the intake-side preparation flag F_IN_PRE is set to 1 as described above, the answer to the question of the step 3 becomes affirmative (YES). In this case, the process proceeds to a step 7, wherein the intake-side preparation control process is performed.

Figure 7:
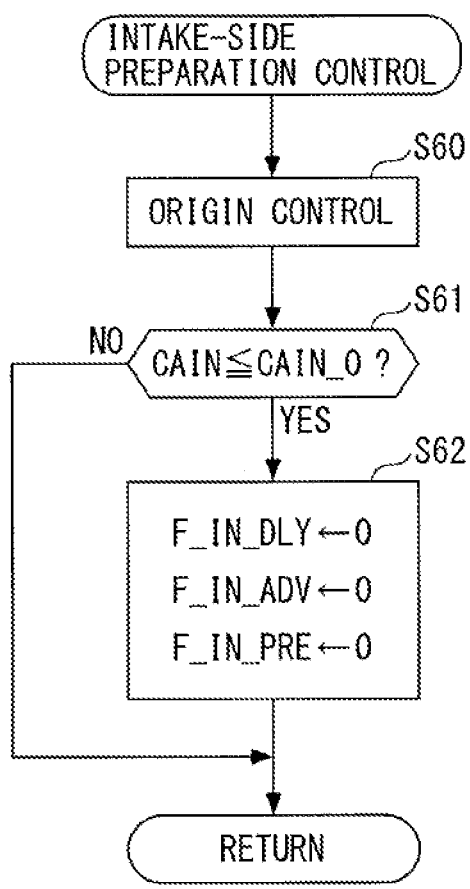
FIG. 7 A flowchart of an intake-side preparation control process.

The intake-side preparation control process is control for causing the intake cam phase CAIN to be retarded to the origin value CAIN_0 in preparation for switching the engine 3 from the decelerating fuel-cut operation to the normal operation, and is specifically performed, as described hereafter with reference to FIG. 7.

As shown in the figure, first, an origin control process is performed in a step 60. In the origin control process, the variable intake cam phase mechanism 12 is controlled such that the intake cam phase CAIN becomes equal to the origin value CAIN_0.

Then, the process proceeds to a step 61, wherein it is determined whether or not the intake cam phase CAIN has become equal to or smaller than the origin value CAIN_0. If the answer to this question is negative (NO), the present process is immediately terminated.

On the other hand, if the answer to the question of the step 61 is affirmative (YES), i.e. if the intake cam phase CAIN has reached the origin value CAIN_0, it is determined that the intake-side preparation control process should be terminated, and the process proceeds to a step 62, wherein the above-mentioned three flags F_IN_DLY, F_IN_ADV, and F_IN_PRE are all reset to 0, followed by terminating the present process.

Referring again to FIG. 3, in the step 7, the intake-side preparation control process is performed as described above, and then the process proceeds to the step 8, described hereinafter.

In the step 8 following any one of the steps 4 to 7, it is determined whether or not the exhaust-side preparation flag F_EX_PRE is equal to 1. If the answer to this question is negative (NO), the process proceeds to a step 9, wherein it is determined whether or not an exhaust-side cleaning completion flag F_EX_OK is equal to 1.

The exhaust-side cleaning completion flag F_EX_OK is set to 1 when the exhaust cam phase CAEX has reached the most retarded value CAEX_RET during execution of the exhaust-side cleaning control process, as described hereinafter. In the following description, the fact that the exhaust cam phase CAEX has reached the most retarded value CAEX_RET during execution of the exhaust-side cleaning control process is referred to "the exhaust-side cleaning has been executed".

If the answer to the question of the step 9 is affirmative (YES), i.e. if the exhaust-side cleaning has been executed, it is determined that there is no need to execute the exhaust-side cleaning control process, and the present process is immediately terminated.

On the other hand, if the answer to the question of the step 9 is negative (NO), the process proceeds to a step 10, wherein it is determined whether or not an exhaust-side operation completion flag F_EX_OKN is equal to 1. The exhaust-side operation completion flag F_EX_OKN is set to 1 when the exhaust cam phase CAEX has reached the most retarded value CAEX_RET during execution of the normal control process, as described hereinafter.

If the answer to the question of the step 10 is affirmative (YES), i.e. if the exhaust cam phase CAEX has reached the most retarded value CAEX_RET during execution of the normal control process, it is determined that there is no need to execute the exhaust-side cleaning control process, and the present process is immediately terminated.

On the other hand, if the answer to the question of the step 10 is negative (NO), i.e. if the exhaust-side cleaning has not yet been executed, and also it is estimated that the exhaust cam phase CAEX has not yet reached the most retarded value CAEX_RET during execution of the normal control process, it is determined that the exhaust-side cleaning control process should be performed, and the process proceeds to a step 11, wherein the exhaust-side cleaning control process is performed.

Figure 8:
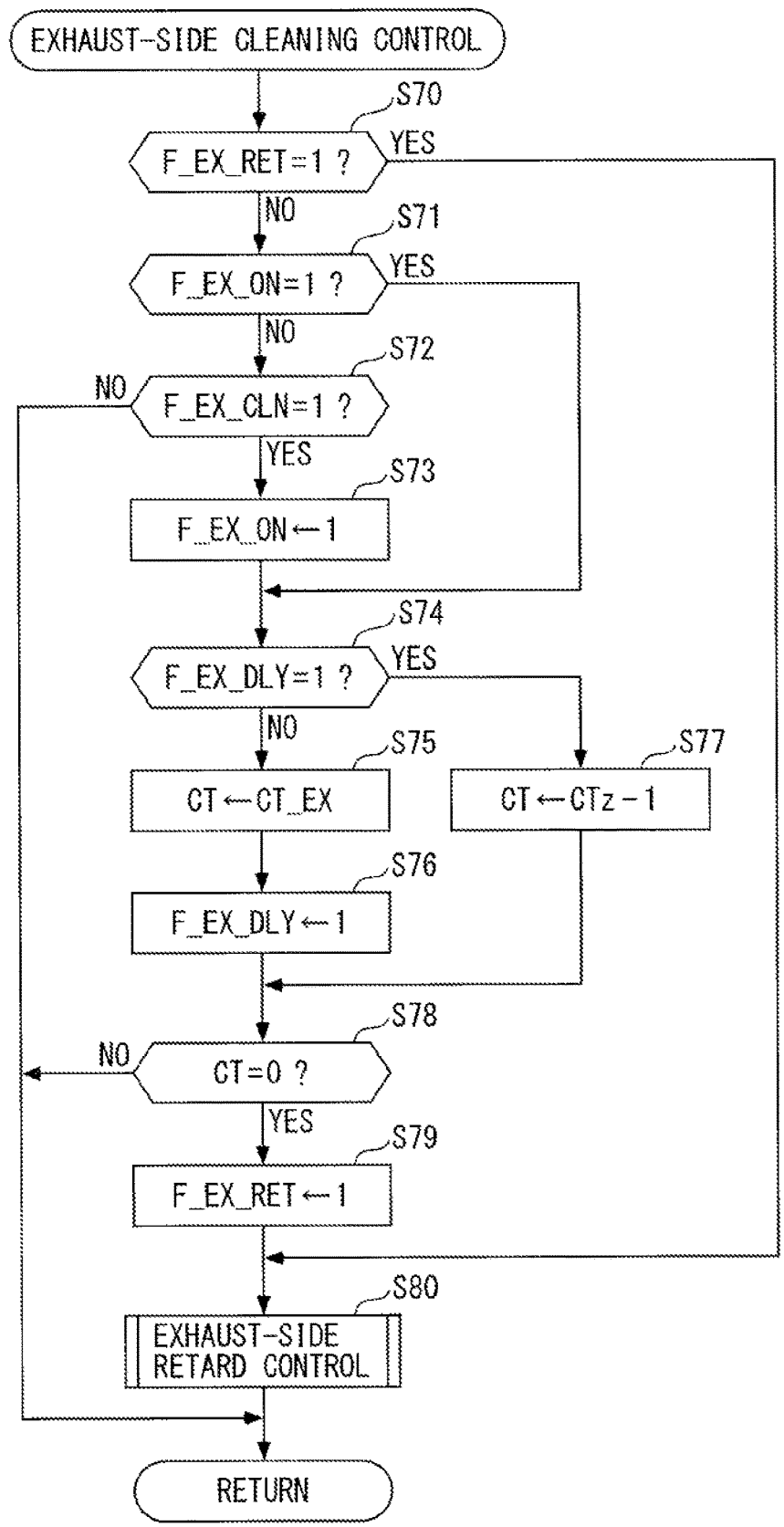
FIG. 8 A flowchart of an exhaust-side cleaning control process.

The exhaust-side cleaning control process is specifically performed, as described hereafter with reference to FIG. 8. As shown in the figure, first, in a step 70, it is determined whether or not an exhaust-side retarded flag F_EX_RET is equal to 1. The exhaust-side retarded flag F_EX_RET indicates whether or not an exhaust-side retard control process, described hereinafter, is being performed.

If the answer to the question of the step 70 is negative (NO), i.e. if the exhaust-side retard control process is not being performed, the process proceeds to a step 71, wherein it is determined whether or not the exhaust-side cleaning in-process flag F_EX_ON is equal to 1. If the answer to this question is negative (NO), the process proceeds to a step 72, wherein it is determined whether or not the above-mentioned exhaust-side cleaning condition flag F_EX_CLN is equal to 1.

If the answer to this question is negative (NO), i.e. if the conditions for executing the exhaust-side cleaning control process are not satisfied, the present process is immediately terminated.

On the other hand, if the answer to the question of the step 72 is affirmative (YES), it is determined that the exhaust-side cleaning control process should be performed, and to indicate the fact, the process proceeds to a step 73, wherein the exhaust-side cleaning in-process flag F_EX_ON is set to 1.

After the exhaust-side cleaning in-process flag F_EX_ON is thus set to 1 in the step 73, the answer to the question of the step 71 becomes affirmative (YES) in each subsequent control time, and in this case, the process proceeds to a step 74.

In the step 74 following the above step 71 or 73, it is determined whether or not an exhaust-side delay flag F_EX_DLY is equal to 1. If the answer to this question is negative (NO), it is determined that an exhaust-side delay process should be performed, and the process proceeds to a step 75, wherein the count value CT of the counter is set to a predetermined exhaust-side delay value CT_EX.

Then, the process proceeds to a step 76, and to indicate that the exhaust-side delay process is being performed, the exhaust-side delay flag F_EX_DLY is set to 1.

After the exhaust-side delay flag F_EX_DLY is thus set to 1 in the step 76, the answer to the question of the step 74 becomes affirmative (YES) in each subsequent control time, and in this case, the process proceeds to a step 77, wherein the count value CT of the counter is set to a value (CTz−1) which is calculated by subtracting 1 from the immediately preceding value CTz thereof.

In a step 78 following the above step 76 or 77, it is determined whether or not the count value CT of the counter is equal to 0. If the answer to this question is negative (NO), i.e. if CT≠0 holds, the present process is immediately terminated.

On the other hand, if the answer to the question of the step 78 is affirmative (YES), i.e. if a time period corresponding to a value ΔT·CT_EX has elapsed after a time at which the conditions for executing the exhaust-side cleaning control process were satisfied, it is determined that the operating states of the variable exhaust cam phase mechanism 22 and the engine 3 are stable, and the exhaust-side retard control process should be performed, and to indicate the fact, the process proceeds to a step 79, wherein the exhaust-side retarded flag F_EX_RET is set to 1.

After the exhaust-side retarded flag F_EX_RET is thus set to 1 in the step 79, the answer to the question of the step 70 becomes affirmative (YES) in each subsequent control time, and in this case, the process proceeds to a step 80.

Figure 9:
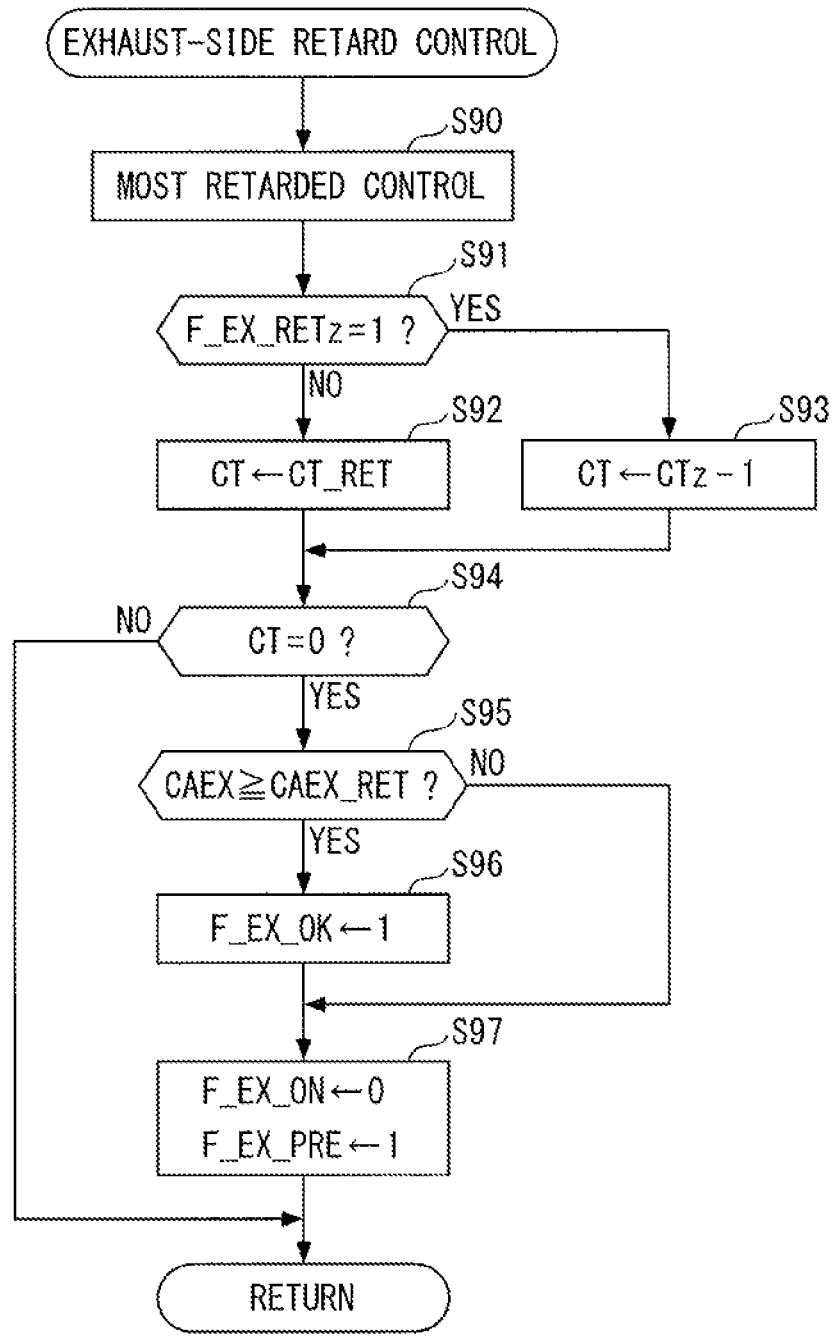
FIG. 9 A flowchart of an exhaust-side retard control process.

In the step 80 following the above step 71 or 79, the exhaust-side retard control process is performed. The exhaust-side retard control process is control for causing the exhaust cam phase CAEX to be retarded to the most retarded value CAEX_RET, and is specifically performed, as described hereafter with reference to FIG. 9.

As shown in the figure, first, in a step 90, a most retarded control process is performed. In the most retarded control process, the variable exhaust cam phase mechanism 22 is controlled such that the exhaust cam phase CAEX becomes equal to the most retarded value CAEX_RET.

Then, the process proceeds to a step 91, wherein it is determined whether or not the immediately preceding value F_EX_RETz of the exhaust-side retarded flag is equal to 1. If the answer to this question is negative (NO), i.e. if the current control time is the first execution time of the exhaust-side retard control process, the count value CT of the counter is set to a predetermined retard control value CT_RET in a step 92.

On the other hand, if the answer to the question of the step 91 is affirmative (YES), i.e. if the exhaust-side retard control process was being performed at the immediately preceding or earlier control time, the count value CT of the counter is set to a value (CTz−1) which is calculated by subtracting 1 from the immediately preceding value CTz thereof, in a step 93.

In a step 94 following the above step 92 or 93, it is determined whether or not the count value CT of the counter is equal to 0. If the answer to this question is negative (NO), i.e. if CT≠0 holds, the present process is immediately terminated.

On the other hand, if the answer to the question of the step 94 is affirmative (YES), i.e. if a time period corresponding to a value ΔT·CT_RET has elapsed after the start time of execution of the most retarded control process, the process proceeds to a step 95, wherein it is determined whether or not the exhaust cam phase CAEX is not smaller than the most retarded value CAEX_RET.

If the answer to this question is affirmative (YES), it is determined that the exhaust cam phase CAEX has reached the most retarded value CAEX_RET, and the exhaust-side cleaning has been completed, and to indicate that the exhaust-side cleaning has been executed, the process proceeds to a step 96, wherein the exhaust-side cleaning completion flag F_EX_OK is set to 1. Next, in a step 97, to indicate that the exhaust-side cleaning control process has been terminated, the exhaust-side cleaning in-process flag F_EX_ON is reset to 0, and at the same time to indicate that an exhaust-side preparation control process should be performed, the exhaust-side preparation flag F_EX_PRE is set to 1, followed by terminating the present process.

On the other hand, if the answer to the question of the step 95 is negative (NO), it is determined that although the exhaust-side cleaning has not been completed, the exhaust-side preparation control process should be performed, and the step 97 is executed, as described above, followed by terminating the present process.

Referring again to FIG. 8, in the step 80, the exhaust-side retard control process is performed, as described above, and then the exhaust-side cleaning control process is terminated.

Referring again to FIG. 3, the exhaust-side cleaning control process is performed as described above in the step 11, and then the present process is terminated. In the exhaust-side cleaning control process, if the exhaust-side preparation flag F_EX_PRE is set to 1 as described above, the answer to the question of the step 8 becomes affirmative (YES), and in this case, the process proceeds to a step 12, wherein the exhaust-side preparation control process is performed.

Figure 10:
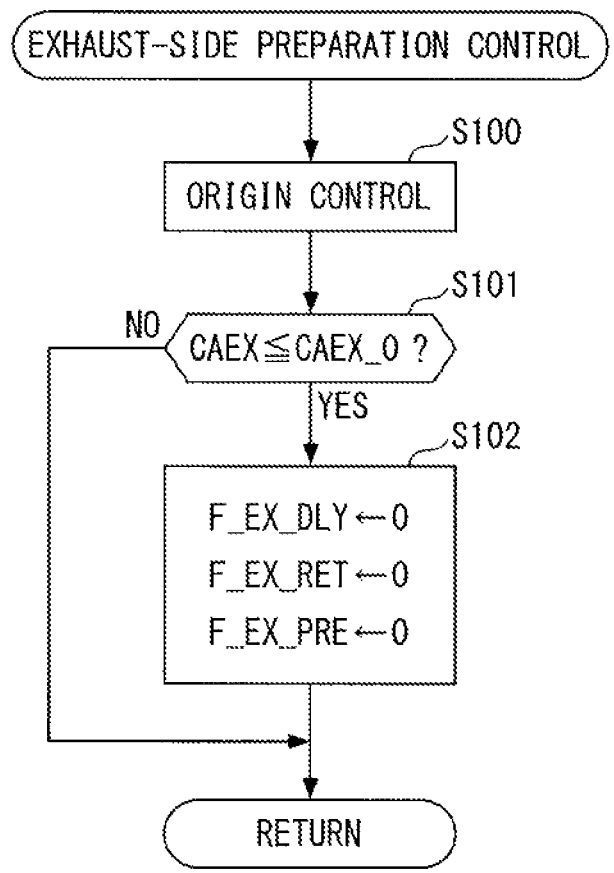
FIG. 10 A flowchart of an exhaust-side preparation control process.

The exhaust-side preparation control process is control for causing the exhaust cam phase CAEX to be advanced to the origin value CAEX_0 in preparation for switching the engine 3 from the decelerating fuel-cut operation to the normal operation, and is specifically performed, as described hereafter with reference to FIG. 10.

As shown in the figure, first, the origin control process is performed in a step 100. In this origin control process, the variable exhaust cam phase mechanism 22 is controlled such that the exhaust cam phase CAEX becomes equal to the origin value CAEX_0.

Then, the process proceeds to a step 101, wherein it is determined whether or not the exhaust cam phase CAEX has become equal to or smaller than the origin value CAEX_0. If the answer to this question is negative (NO), the present process is immediately terminated.

On the other hand, if the answer to the question of the step 101 is affirmative (YES), i.e. if the exhaust cam phase CAEX has reached the origin value CAEX_0, it is determined that the exhaust-side preparation control process should be terminated, and the process proceeds to a step 102, wherein the above-mentioned three flags F_EX_DLY, F_EX_RET, and F_EX_PRE are all reset to 0, followed by terminating the present process.

Referring again to FIG. 3, in the step 12, the exhaust-side preparation control process is performed as described above, followed by terminating the present process.

On the other hand, during execution of the cam phase control process, if the conditions for executing the decelerating FC operation become unsatisfied, the answer to the question of the step 1 becomes negative (NO). In this case, the process proceeds to a step 13, wherein it is determined whether or not the immediately preceding value F_DECFCz of the decelerating fuel-cut operation flag is equal to 1.

If the answer to this question is affirmative (YES), i.e. if the current control time is time immediately after the conditions for executing the decelerating FC operation have been changed from a satisfied state to an unsatisfied state, the process proceeds to a step 14, wherein a flag resetting process is performed, and then the process proceeds to a step 15. In the flag resetting process, the above-mentioned eight flags, F_IN_ON, F_IN_DLY, F_IN_ADV, F_IN_PRE, F_EX_ON, F_EX_DLY, F_EX_RET, F_EX_PRE are all reset to 0.

On the other hand, if the answer to the question of the step 13 is negative (NO), i.e. if the conditions for executing the decelerating FC operation became unsatisfied at the immediately preceding or earlier control time, the process proceeds to the step 15.

In the step 15 following the step 13 or 14, the normal control process is performed. In this normal control process, the intake cam phase CAIN and the exhaust cam phase CAEX are controlled according to the engine speed NE, the accelerator pedal opening AP, and so forth. Further, during execution of the normal control process, when the intake cam phase CAIN is controlled to the most advanced value CAIN_ADV, the above-mentioned intake-side operation completion flag F_IN_OKN is set to 1, and when the exhaust cam phase CAEX has reached the most retarded value CAEX_RET, the above-mentioned exhaust-side operation completion flag F_EX_OKN is set to 1.

AS described above, the normal control process is performed in the step 15, followed by terminating the present process.

Figure 11:
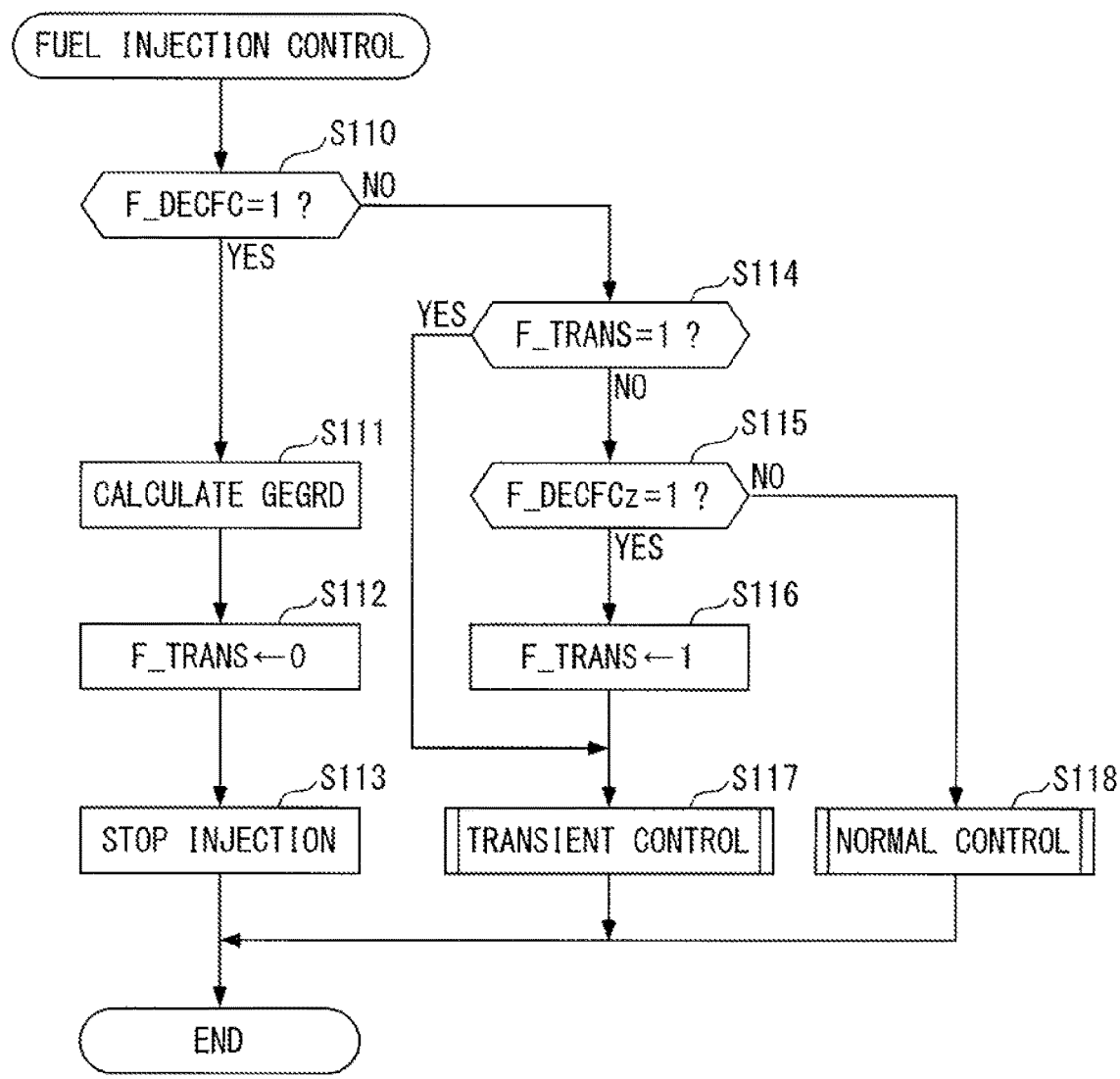
FIG. 11 A flowchart of a fuel injection control process.

Next, the fuel injection control process will be described with reference to FIG. 11. The fuel injection control process is performed at a control period ΔTn in synchronism with generation timing of each pulse of the TDC signal.

As shown in the figure, first, in a step 110, it is determined whether or not the above-mentioned decelerating fuel-cut operation flag F_DECFC is equal to 1. If the answer to this question is affirmative (YES), i.e. if it is during the decelerating FC operation, the process proceeds to a step 111, wherein an estimated internal EGR amount GEGRD is calculated by the following equation (1):

[Math. 1]

$$GEGRD = \frac{PA \cdot Vcyl}{R \cdot TB} \quad (1)$$

In this equation (1), Vcyl represents an in-cylinder volume, and R represents a gas constant. Note that in a case where the engine 3 is provided with an in-cylinder pressure sensor for detecting an in-cylinder pressure Pcyl, the estimated internal EGR amount GEGRD may be calculated by substituting the in-cylinder pressure Pcyl into the above equation (1) in place of the atmospheric pressure PA.

Then, the process proceeds to a step 112, wherein a transient control flag F_TRANS is set to 0. Next, fuel injection by the fuel injection valve 7 is stopped in a step 113, followed by terminating the present process.

On the other hand, if the answer to the question of the step 110 is negative (NO), the process proceeds to a step 114, wherein it is determined whether or not the transient control flag F_TRANS is equal to 0. If the answer to this question is negative (NO), the process proceeds to a step 115, wherein it is determined whether or not the immediately preceding value F_DECFCz of the decelerating fuel-cut operation flag is equal to 1.

If the answer to this question is affirmative (YES), i.e. if the current control time is time immediately after the conditions for executing the decelerating FC operation have been changed from the satisfied state to the unsatisfied state, it is determined that a transient control process should be performed, and to indicate the fact, the process proceeds to a step 116, wherein the transient control flag F_TRANS is set to 1. Then, the process proceeds to a step 117.

After the transient control flag F_TRANS is thus set to 1 in the step 116, the answer to the question of the step 114 becomes affirmative (YES) in each subsequent control time, and in this case, the process proceeds to the step 117.

Figure 12:
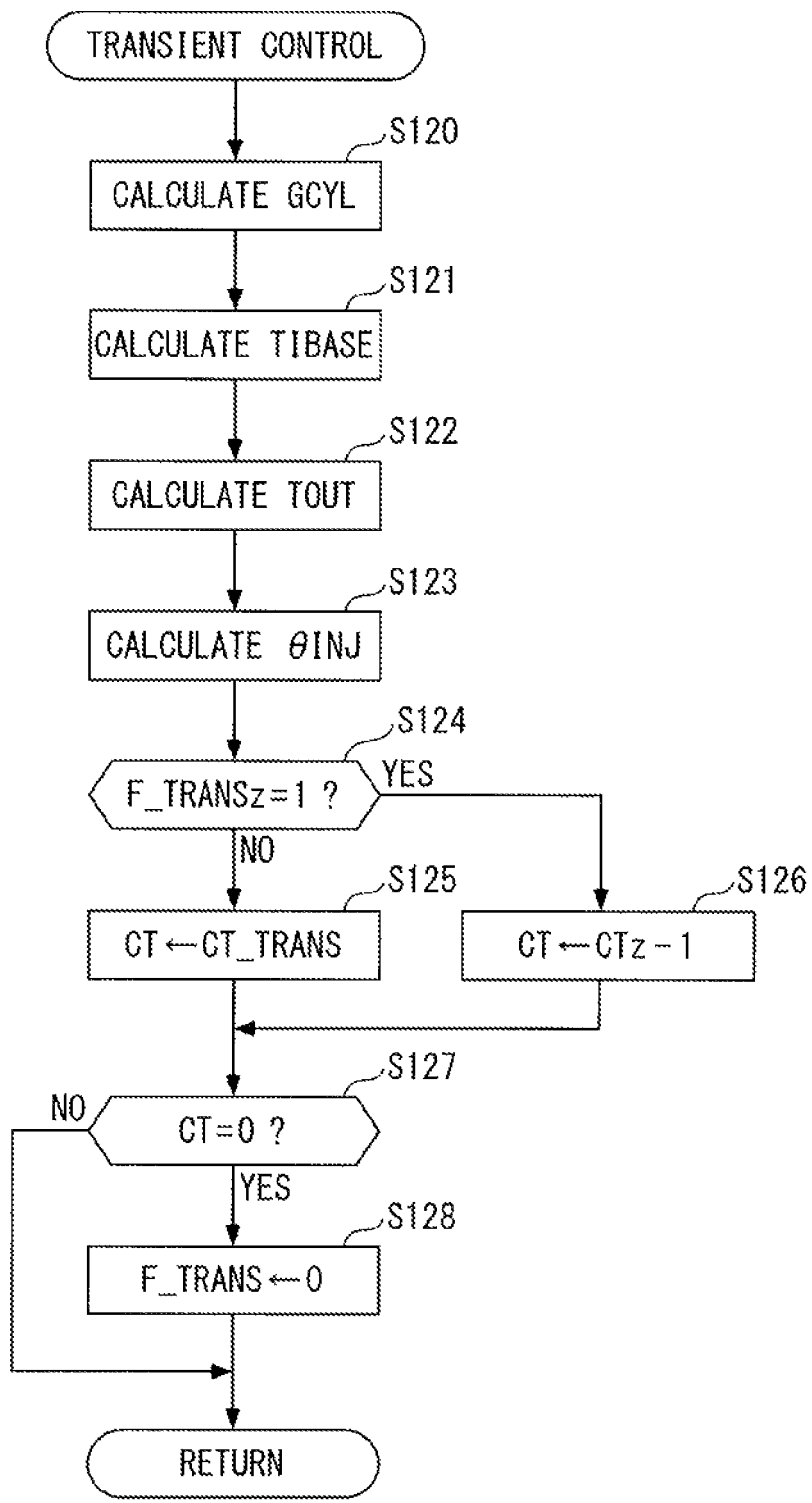
FIG. 12 A flowchart of a transient control process.

In the step 117 following the above step 114 or 116, the transient control process is performed. The transient control process is specifically performed, as described hereafter with reference to FIG. 12.

As shown in the figure, first, in a step 120, an in-cylinder gas amount GCYL is calculated by the following equation (2):

[Math. 2]

$$GCYL = GAIR + GEGRD \quad (2)$$

Then, the process proceeds to a step 121, wherein a basic injection amount TIBASE is calculated by searching a map (not shown) according to the in-cylinder gas amount GCYL.

Next, in a step 122, a fuel injection amount TOUT is calculated by correcting the basic injection amount TIBASE according to the voltage of a battery and various operating parameters (e.g. the engine coolant temperature TW).

In a step 123 following the step 122, an injection timing θ INJ is calculated according to the fuel injection amount TOUT and the engine speed NE.

Then, the process proceeds to a step 124, wherein it is determined whether or not the immediately preceding value F_TRANSz of the transient control flag is equal to 1. If the answer to this question is negative (NO), i.e. if the current control time is the first execution time of the transient control process, the process proceeds to a step 125, wherein the count value CT of the counter is set to a predetermined transient control value CT_TRANS.

On the other hand, if the answer to the question of the step 124 is affirmative (YES), i.e. if the transient control process was being performed at the immediately preceding or earlier control time, the process proceeds to a step 126, wherein the count value CT of the counter is set to a value (CTz−1) which is calculated by subtracting 1 from the immediately preceding value CTz thereof.

In a step 127 following the above step 125 or 126, it is determined whether or not the count value CT of the counter is equal to 0. If the answer to this question is negative (NO), i.e. if CT≠0 holds, the present process is immediately terminated.

On the other hand, if the answer to the question of the step 127 is affirmative (YES), i.e. if a time period corresponding to a value ΔTn·CT_TRANS has elapsed after the start time of execution of the transient control process, it is determined that the engine 3 is in a stable operating state, and the normal control process should be performed, and then to indicate the fact, the process proceeds to a step 128, wherein the transient control flag F_TRANS is set to 0, followed by terminating the present process.

Referring again to FIG. 11, after the transient control process is thus performed in the step 117, the fuel injection control process is terminated.

On the other hand, if the answer to the question of the step 115 is negative (NO), the process proceeds to a step 118, wherein the normal control process is performed, followed by terminating the present process. In this normal control process, although not shown, the fuel injection amount TOUT and the injection timing θ INJ are calculated according to the operating state (e.g. the air amount GAIR, the intake pressure PB, and the engine coolant temperature TW) of the engine 3, and control input signals corresponding thereto are supplied to the fuel injection valves 7, whereby fuel is injected to the cylinders 3*a* from the fuel injection valves 7.

Figure 13:
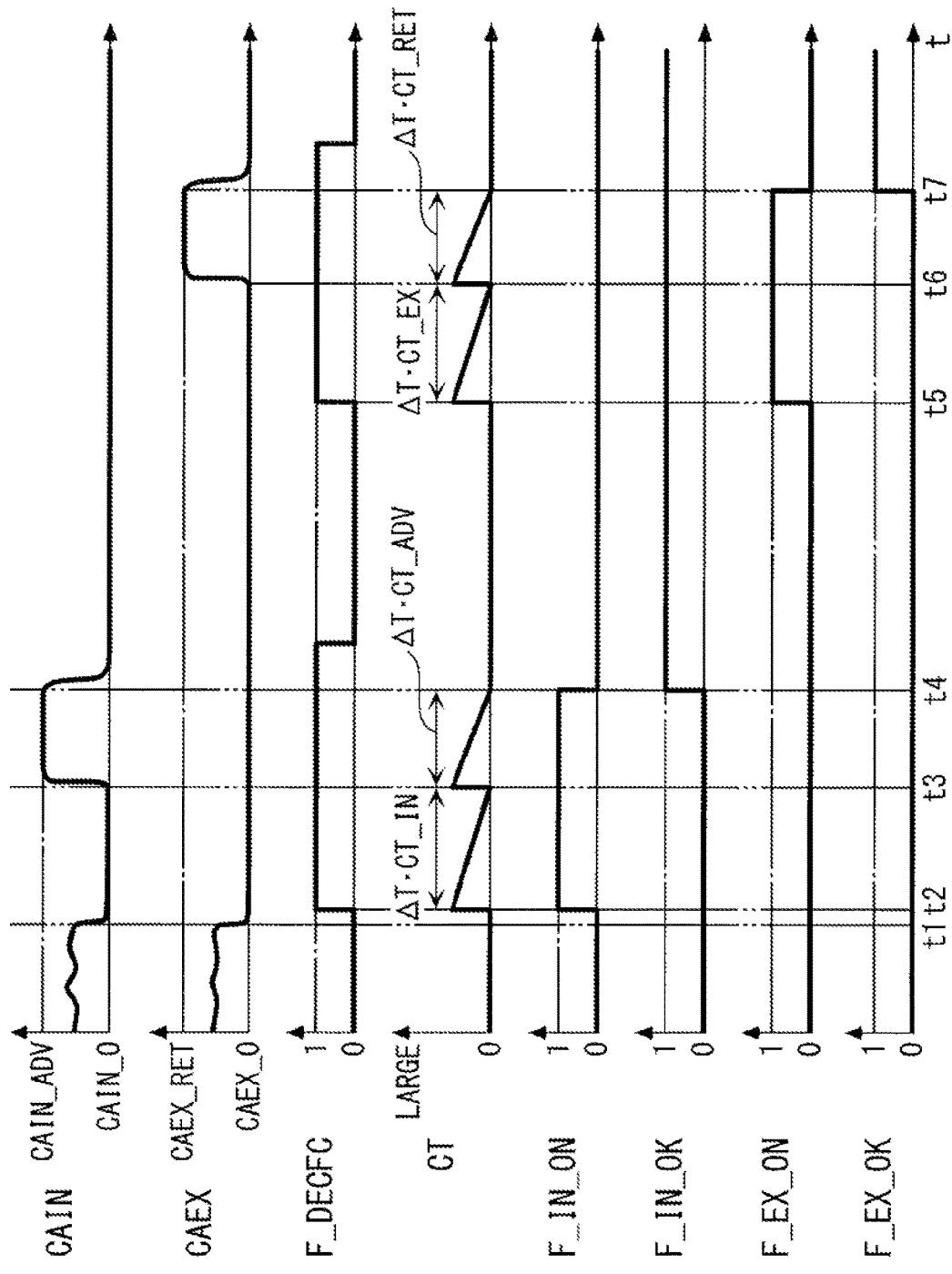
FIG. 13 A timing diagram showing an example of control results obtained by performing the intake-side and exhaust-side cleaning control process.

Next, an example of control results obtained by performing the above-described cam phase control process will be described with reference to FIG. 13. As shown in the figure, during traveling of the vehicle, in a state in which neither of the intake-side cleaning control process and the exhaust-side cleaning control process has been executed, and hence the two flags F_IN_OK=F_EX_OK=0 holds, when the accelerator pedal is released at a time point t1, causing the accelerator pedal opening AP=0 to hold, the intake cam phase CAIN is controlled to the origin value CAIN_0, and the exhaust cam phase CAEX is controlled to the origin value CAEX_0.

Immediately thereafter, at a time (time point t2) when the conditions for executing the decelerating fuel-cut operation are satisfied and the conditions for executing the intake-side cleaning control process are satisfied, causing when F_DECFC=1 to hold, the intake-side cleaning in-process flag F_IN_ON is set to 1, and at the same time the count value CT of the counter is set to the predetermined intake-side delay value CT_IN. This starts an intake-side delay control process.

Then, at a time (time point t3) when a time period over which the intake-side delay control process has been performed reaches the value ΔT·CT_IN, causing the intake-side delay control process to be completed, the count value CT of the counter is set to the advance control value CT_ADV, whereby the intake-side advance control process is started. As a consequence, the intake cam phase CAIN is controlled such that it becomes equal to the most advanced value CAIN_ADV.

With the lapse of time, if CAIN≥CAIN_ADV to holds at a time (time point t4) when a time period over which the intake-side advance control process has been performed reaches the value ΔT·CT_ADV, the intake-side cleaning completion flag F_IN_OK is set to 1. At the same time, the intake-side cleaning in-process flag F_IN_ON is reset to 0, and the intake-side preparation control process is started. With this, the intake cam phase CAIN is controlled such that it becomes equal to the origin value CAIN_0. Then, the decelerating fuel-cut operation is terminated.

Then, with the lapse of time, if the conditions for executing the exhaust-side cleaning control process are satisfied at a time (time point t5) when the conditions for executing the decelerating fuel-cut operation are satisfied again, causing F_DECFC=1 to hold, the exhaust-side cleaning in-process flag F_EX_ON is set to 1, and at the same time the count value CT of the counter is set to the predetermined exhaust-side delay value CT_EX. This starts an exhaust-side retard control process.

Then, at a time (time point t6) when a time period over which the exhaust-side retard control process has been performed reaches the value ΔT·CT_EX, causing the exhaust-side retard control process to be completed, the count value CT of the counter is set to the retard control value CT_RET, whereby the exhaust-side retard control process is started. As a consequence, the exhaust cam phase CAEX is controlled such that it becomes equal to the most retarded value CAEX_RET.

With the lapse of time, if CAEX≥CAEX_RET holds at a time (time point t7) when a time period over which the exhaust-side retard control process has been performed reaches the value ΔT·CT_RET, the exhaust-side cleaning completion flag F_EX_OK is set to 1. At the same time, the exhaust-side cleaning in-process flag F_EX_ON is reset to 0, and the exhaust-side preparation control process is started. With this, the exhaust cam phase CAEX is controlled such that it becomes equal to the origin value CAEX_0.

As described hereinabove, according to the control apparatus 1 of the present embodiment, in the cleaning condition determination process in the step 2, when one of the intake-side cleaning condition flag F_IN_CLN and the exhaust-side cleaning condition flag F_EX_CLN is set to 1, the other thereof is set to 0, so that the intake-side and exhaust-side cleaning control processes are not performed at the same time, and during execution of one of the control processes, the other is inhibited from being performed. With this, differently from the case of PTL 1, at a time when the decelerating FC operation is terminated, and the cleaning control is forcibly terminated, it is possible to prevent both of the intake cam phase CAIN and the exhaust cam phase CAEX from being held at values that increase the valve overlap period, which makes it possible to avoid a state in which the internal EGR amount is large. Particularly, it is possible to prevent both of CAIN=CAIN_ADV and CAEX=CAEX_RET from holding, whereby it is possible to avoid a state in which the valve overlap period is longest. As a consequence, when the engine 3 is returned from the decelerating FC operation to the normal operation, it is possible to ensure stable combustion of the mixture, thereby making it possible to enhance marketability.

Further, during execution of the intake-side cleaning control process, when the intake cam phase CAIN has reached the predetermined most advanced value CAIN_ADV, it is determined that the intake-side cleaning has been executed, and during execution of the exhaust-side cleaning control process, when the exhaust cam phase CAEX has reached the predetermined most retarded value CAEX_RET, it is determined that the exhaust-side cleaning has been executed, and hence it is possible to accurately determine that the intake-side and exhaust-side cleanings have been executed. This makes it possible to prevent the intake-side and exhaust-side cleaning control processes from being executed more than necessary, thereby making it possible to enhance marketability.

Furthermore, when it is determined that the intake-side cleaning has been executed, the intake-side cleaning completion flag F_IN_OK is set to 1, and when it is determined that the exhaust-side cleaning has been executed, the exhaust-side cleaning completion flag F_EX_OK is set to 1. Further, the values of these flags F_IN_OK and F_EX_OK are held (stored) in the RAM insofar as the ignition switch is in the ON state. As a consequence, in one operating cycle of the engine 3 (a time period after the ignition switch is turned on from an off state until it is turned off again), the intake-side cleaning control process and the exhaust-side cleaning control process are performed only once, respectively, so that it is possible to prevent the above cleaning control processes from being performed more than necessary, which makes it possible to further enhance marketability.

Further, during the normal operation of the engine 3, in the case where the intake cam phase CAIN has reached the predetermined most advanced value CAIN_ADV, when the engine 3 is switched from the normal operation to the decelerating FC operation, the answer to the question of the step 5 becomes affirmative (YES), whereby the intake-side cleaning control process is inhibited. During the normal operation of the engine 3, in the case where the exhaust cam phase CAEX has reached the predetermined most retarded value CAEX_RET, when the engine 3 is switched from the normal operation to the decelerating FC operation, the answer to the question of the step 10 becomes affirmative (YES), whereby the exhaust-side cleaning control process is inhibited. That is, when the engine 3 shifts from the normal operation to the decelerating FC operation, if there is no need to execute the intake-side and exhaust-side cleaning control processes, the cleaning control processes are inhibited. This makes it possible to prevent the above cleaning control processes from being performed more than necessary, whereby it is possible to further enhance marketability.

In addition to this, during the decelerating FC operation, the throttle valve 25a is controlled to the fully-closed state, and the air amount GAIR detected by the air flow sensor 32 becomes equal to 0 (GAIR=0), so that there is a fear that when the engine 3 is returned from the decelerating FC operation to the normal operation, an in-cylinder air amount as a calculated value is calculated as a very small value, although air exists in each cylinder 3a even during the decelerating FC operation. On the other hand, according to the control apparatus 1 of the present embodiment, the estimated internal EGR amount GEGRD is always calculated during the decelerating FC operation, and when the engine 3 is returned from the decelerating FC operation to the normal operation, the in-cylinder gas amount GCYL is calculated, in the transient control process of the fuel injection control process, as the sum of the estimated internal EGR amount GEGRD and the air amount GAIR detected by the air flow sensor 32, and therefore it is possible to calculate the in-cylinder gas amount GCYL with accuracy. Further, since the fuel injection amount TOUT and the injection timing θ INJ are calculated using the in-cylinder gas amount GCYL calculated as above with accuracy, it is possible to control the air-fuel ratio of the mixture to an appropriate value in the air-fuel ratio control. As a consequence, it is possible to ensure stable combustion of the mixture, and excellent exhaust emission characteristics.

Note that although the embodiment is an example in which the intake-side cleaning control process and the exhaust-side cleaning control process are performed during the decelerating fuel-cut operation of the engine 3, the cleaning control processes may be performed not only during the decelerating fuel-cut operation but also in an operating state in which the output of the engine 3 is not required. For example, in a hybrid vehicle including an internal combustion engine and an electric motor as motive power sources, the intake-side cleaning control process and the exhaust-side cleaning control process may be performed during traveling of the vehicle using only the motive power of the electric motor. In this case, it is only required to adopt such a configuration that hydraulic pressure is supplied to the variable intake cam phase mechanism 12 and the variable exhaust cam phase mechanism 22, irrespective of whether or not the engine is operating.

Further, although the embodiment is an example in which the fuel injection control is performed using the estimated internal EGR amount GEGRD when the engine 3 is switched from the decelerating fuel-cut operation to the normal operation, the method of controlling the operating states of the engine using the estimated internal EGR amount is not limited to this, but the ignition timing of the engine may be controlled using the estimated internal EGR amount.

Furthermore, although the embodiment is an example in which the control apparatus of the present invention is applied to an internal combustion engine for a vehicle, the control apparatus of the present invention is not limited to this, but can also be applied to internal combustion engines for boats and internal combustion engines for other industrial machines.

REFERENCE SIGNS LIST 1 control apparatus
2 ECU (intake-side cleaning control means, exhaust-side cleaning control means, selection inhibition means, intake cam phase-detecting means, intake-side execution completion-determining means, exhaust cam phase-detecting means, exhaust-side execution completion-determining means, estimated internal EGR amount-calculating means, operating state control means)
3 internal combustion engine
3a cylinder
3c crankshaft
4 intake valve
5 exhaust valve
11a intake cam
12 variable intake cam phase mechanism
21a exhaust cam
22 variable exhaust cam phase mechanism
30 crank angle sensor (intake cam phase-detecting means, exhaust cam phase-detecting means)
37 intake cam angle sensor (intake cam phase-detecting means)
38 exhaust cam angle sensor (exhaust cam phase-detecting means)
CAIN intake cam phase
CAIN_ADV predetermined most advanced value
CAEX exhaust cam phase
CAEX_RET predetermined most retarded value
GEGRD estimated internal EGR amount

The invention claimed is:
1. A control apparatus for an internal combustion engine that includes a variable intake cam phase mechanism of a hydraulically-driven type for changing an intake cam phase which is a phase of an intake cam for opening and closing an intake valve with respect to a crankshaft, and a variable exhaust cam phase mechanism of a hydraulically-driven type for changing an exhaust cam phase which is a phase of an exhaust cam for opening and closing an exhaust valve with respect to the crankshaft, the control apparatus controlling the intake cam phase and the exhaust cam phase via the variable intake cam phase mechanism and the variable exhaust cam phase mechanism, comprising:
    intake-side cleaning control means for performing intake-side cleaning control that controls the intake cam phase to be advanced such that a valve overlap period of the intake valve and the exhaust valve is increased;

exhaust-side cleaning control means for performing exhaust-side cleaning control that controls the exhaust cam phase to be retarded such that the valve overlap period of the intake valve and the exhaust valve is increased; and selection inhibition means for selecting one of the intake-side cleaning control by said intake-side cleaning control means and the exhaust-side cleaning control by said exhaust-side cleaning control means so as to cause the one to be performed, and inhibiting the other thereof, according to an operating state of the engine.

2. The control apparatus according to claim 1, wherein in the intake-side cleaning control, the intake cam phase is controlled such that the intake cam phase becomes equal to a predetermined most advanced value, the control apparatus further comprising:

intake cam phase-detecting means for detecting the intake cam phase; and intake-side execution completion-determining means for determining that the intake-side cleaning control has been executed, when the intake cam phase detected during execution of the intake-side cleaning control has reached the predetermined most advanced value.

3. The control apparatus according to claim 1, wherein in the exhaust-side cleaning control, the exhaust cam phase is controlled such that the exhaust cam phase becomes equal to a predetermined most retarded value, the control apparatus further comprising:

exhaust cam phase-detecting means for detecting the exhaust cam phase; and exhaust-side execution completion-determining means for determining that the exhaust-side cleaning control has been executed, when the exhaust cam phase detected during execution of the exhaust-side cleaning control has reached the predetermined most retarded value.

4. The control apparatus according to claim 1, wherein the intake-side cleaning control and the exhaust-side cleaning control are performed during a decelerating fuel-cut operation of the engine, the control apparatus further comprising:

estimated internal EGR amount-calculating means for calculating an estimated internal EGR amount, which is an estimated value of an internal EGR amount in a cylinder of the engine, during the decelerating fuel-cut operation; and operating state control means for controlling an operating state of the engine, using the calculated estimated internal EGR amount, after termination of the decelerating fuel-cut operation.

5. The control apparatus according to claim 2, wherein in the exhaust-side cleaning control, the exhaust cam phase is controlled such that the exhaust cam phase becomes equal to a predetermined most retarded value, the control apparatus further comprising:

exhaust cam phase-detecting means for detecting the exhaust cam phase; and exhaust-side execution completion-determining means for determining that the exhaust-side cleaning control has been executed, when the exhaust cam phase detected during execution of the exhaust-side cleaning control has reached the predetermined most retarded value.

6. The control apparatus according to claim 2, wherein the intake-side cleaning control and the exhaust-side cleaning control are performed during a decelerating fuel-cut operation of the engine, the control apparatus further comprising:

estimated internal EGR amount-calculating means for calculating an estimated internal EGR amount, which is an estimated value of an internal EGR amount in a cylinder of the engine, during the decelerating fuel-cut operation; and operating state control means for controlling an operating state of the engine, using the calculated estimated internal EGR amount, after termination of the decelerating fuel-cut operation.

7. The control apparatus according to claim 3, wherein the intake-side cleaning control and the exhaust-side cleaning control are performed during a decelerating fuel-cut operation of the engine, the control apparatus further comprising:

estimated internal EGR amount-calculating means for calculating an estimated internal EGR amount, which is an estimated value of an internal EGR amount in a cylinder of the engine, during the decelerating fuel-cut operation; and operating state control means for controlling an operating state of the engine, using the calculated estimated internal EGR amount, after termination of the decelerating fuel-cut operation.

* * * * *